United States Patent [19]
Fukuda et al.

[11] Patent Number: 5,864,735
[45] Date of Patent: Jan. 26, 1999

[54] IMAGE FORMING APPARATUS COMPRISING A COMBINATION OF A HOST COMPUTER, A PRINTER, A COPY MACHINE, AND AN AUTOMATIC DOCUMENT FEEDER

[75] Inventors: Motoyuki Fukuda; Kenji Yamamura; Satoshi Tanaka, all of Osaka, Japan

[73] Assignee: Mita Industrial Co., Ltd., Osaka, Japan

[21] Appl. No.: 811,839

[22] Filed: Mar. 5, 1997

[30] Foreign Application Priority Data

Mar. 13, 1996 [JP] Japan .................................... 8-083052
Mar. 13, 1996 [JP] Japan .................................... 8-083053

[51] Int. Cl.⁶ .................................................. G03G 15/22
[52] U.S. Cl. ........................... 399/139; 271/301; 399/2; 399/8; 399/17; 399/367
[58] Field of Search ............................... 399/139, 8, 2, 399/130, 16, 17, 18, 367, 371; 395/114; 271/3.01, 3.14, 3.19, 8.1, 278, 279, 301

[56] References Cited

U.S. PATENT DOCUMENTS

| | | | |
|---|---|---|---|
| 4,639,125 | 1/1987 | Okuda et al. .................... | 271/301 X |
| 4,879,574 | 11/1989 | Nakamura et al. ............... | 399/17 |
| 4,967,240 | 10/1990 | Kitano et al. .................... | 399/364 |
| 5,077,579 | 12/1991 | Sibusawa et al. ................ | 399/17 |
| 5,198,858 | 3/1993 | Sugawa et al. ................... | 399/130 |

FOREIGN PATENT DOCUMENTS 04-264581  9/1992  Japan .
04-335661  11/1992  Japan .

*Primary Examiner*—Arthur T. Grimley
*Assistant Examiner*—Sophia S. Chen
*Attorney, Agent, or Firm*—Beveridge, DeGrandi, Weilacher & Young, LLP

[57] ABSTRACT

An image forming machine including a host computer, a printer, a copying machine, and a document supply device for conveying a document printed by the printer to an automatic document feeder of the copying machine, in which a controller is provided for controlling a copy action based on a copy command from the host computer. The controller sends a left-behind document signal when a document is present on document stand of the automatic document feeder, while the host computer shows the presence of the left-behind document on a display when receiving the left-behind document signal from the controller.

5 Claims, 18 Drawing Sheets

IMAGE FORMING APPARATUS COMPRISING A COMBINATION OF A HOST COMPUTER, A PRINTER, A COPY MACHINE, AND AN AUTOMATIC DOCUMENT FEEDER

FIELD OF THE INVENTION

This invention relates to an image forming machine comprising a combination of a host computer capable of network connection, such as a computer, a word processor or an image editing device; a printer as an output device for the host computer; and a copying machine equipped with an automatic document feeder.

DESCRIPTION OF THE PRIOR ART

In recent years, a laser printer has found wide use as an output device for a computer, a word processor or an image editing device. A laser printer used as an output device for a word processor or the like gives a clear printed image, but its print speed is much lower than the print speed of a copying machine. If it is desired to obtain image information, produced by a word processor or the like, as a multiplicity of prints, it is customary practice to put out the image information from the word processor or the like by means of a laser printer, thereby preparing a document, and then make a necessary number of copies of this document by use of a high speed copying machine. This procedure is tiresome. As a solution to this problem, Japanese Utility Model Publication No. 2616/87, Japanese Laid-Open Patent Publication No. 176967/86 and Japanese Laid-Open Patent Publication No. 264581/92, for example, disclose image forming machines in each of which a printer and a copying machine are coupled together, image information produced by a word processor or the like is printed by the printer, the resulting printed document is conveyed onto a document-placing glass panel of the copying machine, and then a required number of copies of this document are made by the copying machine.

To realize an image forming machine comprising a combination of a host computer, such as a computer, a word processor or an image editing device, a printer, and a copying machine including an automatic document feeder, it is necessary to solve the following technical problems:

1. A document printed by the printer on the basis of print data from the host computer is conveyed onto document stand means which constitutes the automatic document feeder of the copying machine. Assume that a document which the operator forgot to recover at completion of a preceding copy action is left behind on the document stand means. In this case, the document printed by the printer is conveyed onto the left-behind document on the document stand means. If a copy action is performed in this state, even the left-behind document is copied.
2. A document printed by the printer on the basis of print data from the host computer and conveyed onto the document stand means of the automatic document feeder is fed to an exposure position during a copy action, and then conveyed again onto the document stand means after exposure. Assume that the operator forgets to withdraw the document, returned to the document stand means, after completion of the copy action. If this left-behind document is present on the document stand means when a next document printed by the printer on the basis of print data from the host computer is conveyed onto the document stand means of the automatic document feeder, the document printed by the printer is conveyed onto the left-behind document. If a copy action is performed in this state, even the left-behind document is copied.

SUMMARY OF THE INVENTION

A first object of the present invention is to provide an image forming machine which, if a document is present on the document stand means of the automatic document feeder when a print/copy request is made by the host computer, indicates the presence of the left-behind document on a display of the host computer.

A second object of the invention is to provide an image forming machine which, if a document is present on the document stand means of the automatic document feeder when a print/copy request is made by the host computer, directly discharges a document printed by the printer without conveying it to the automatic document feeder of the copying machine.

A third object of the invention is to provide an image forming machine in which a document printed by the printer on the basis of print data from the host computer and conveyed onto the document stand means of the automatic document feeder is fed to an exposure position during a copy action, and expelled to the outside of the automatic document feeder after exposure, so that the document can be prevented from being left behind on the document stand means.

To attain the first object, the invention provides an image forming machine comprising a host computer; a printer for printing the output of the host computer; a copying machine for making a predetermined number of copies of a document which is a printed sheet printed by the printer, the copying machine being equipped with an automatic document feeder; and a document supply device for conveying the document printed by the printer to document stand means of the automatic document feeder;

the image forming machine including
a document detector for detecting the presence or absence of the document on the document stand means of the automatic document feeder, and
control means which controls a copy action on the basis of a copy command from the host computer, and which, when the document is present on the document stand means on the basis of a detection signal from the document detector, transmits a left-behind document signal to the host computer; wherein
if the control means receives from the document detector a detection signal indicating the presence of a document on the document stand means when a print/copy request is made by the host computer, the control means transmits a left-behind document signal to the host computer, and
when the left-behind document signal from the control means is entered, the host computer shows the presence of the left-behind document on the display of the host computer.

To attain the second object, the invention provides an image forming machine comprising a host computer; a printer for printing the output of the host computer; a copying machine for making a predetermined number of copies of a document which is a printed sheet printed by the printer, the copying machine being equipped with an automatic document feeder; and a document supply device for conveying the document printed by the printer to document stand means of the automatic document feeder;

the image forming machine including
 document discharge means for directly discharging the document printed by the printer,
 a document detector for detecting the presence or absence of the document on the document stand means of the automatic document feeder, and
 control means which controls a copy action on the basis of a copy command from the host computer, and which, when the document is present on the document stand means on the basis of-a detection signal from the document detector, transmits a left-behind document signal to the host computer; wherein
 if the control means receives from the document detector a detection signal indicating the presence of a document on the document stand means when a print/copy request is made by the host computer, the control means actuates the document discharge means to directly discharge the document printed by the printer.

To attain the third object, the invention provides an image forming machine comprising a host computer; a printer for printing the output of the host computer; a copying machine for making a predetermined number of copies of a document which is a printed sheet printed by the printer, the copying machine being equipped with an automatic document feeder; and a document supply device for conveying the document printed by the printer to document stand means of the automatic document feeder;

the image forming machine including
 document discharge means for discharging the document, which has been conveyed from the document stand means of the automatic document feeder to an exposure position of the copying machine and exposed there, to the outside of the automatic document feeder, and
 control means for movingly controlling the document discharge means; wherein
 upon completion of an exposure action of the document conveyed to the exposure position of the copying machine, the control means actuates the document discharge means to discharge the document to the outside of the automatic document feeder.

Other objects and features of the invention will become apparent from the following description.

DETAILED DESCRIPTION OF THE PREFERRED EMBODIMENTS

The present invention will now be described in more detail by reference to the accompanying drawings which illustrate preferred embodiments of an image forming machine constructed in accordance with the present invention.

Figure 1:
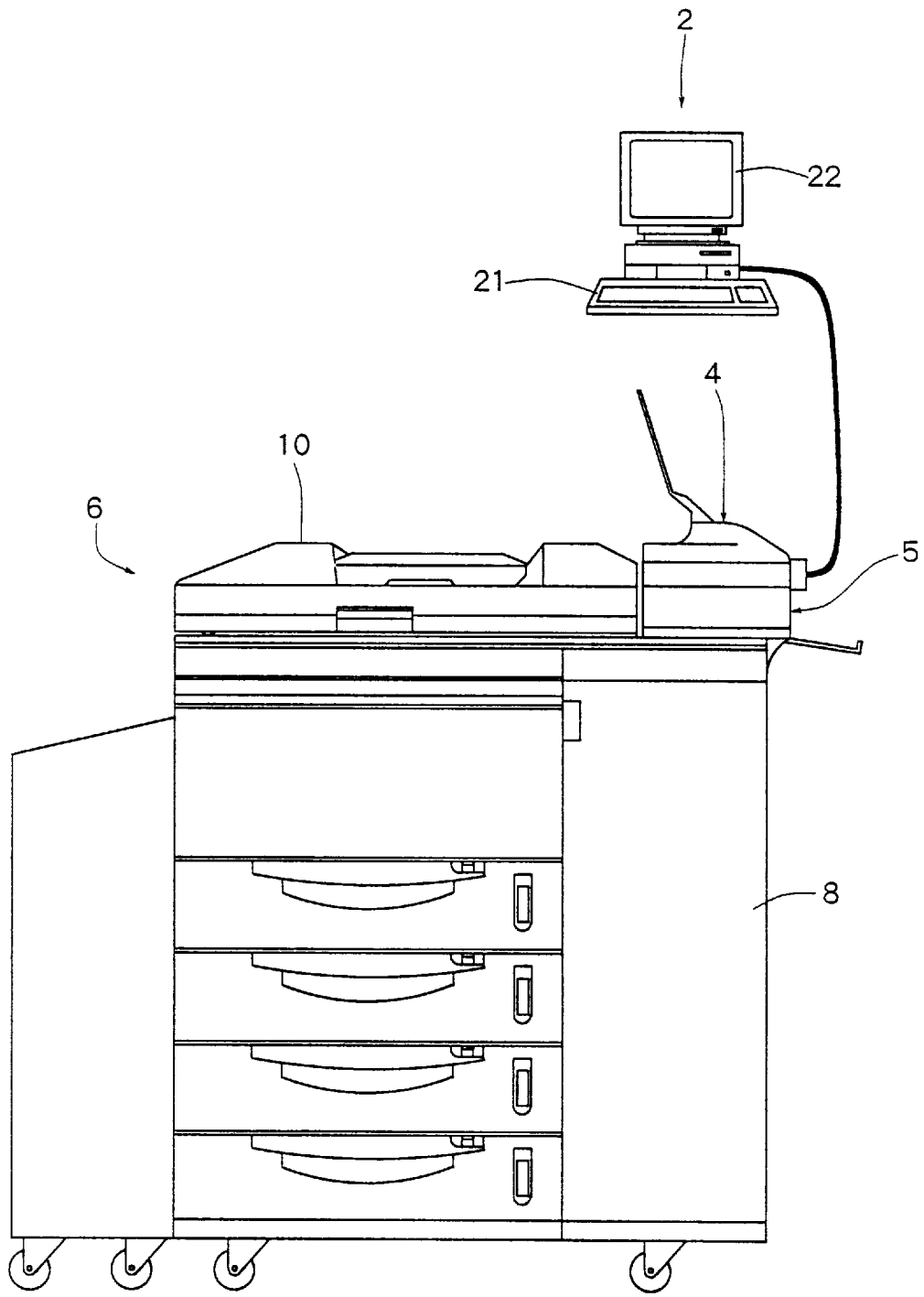
FIG. 1 is a schematic structural view of an image forming machine constructed in accordance with the present invention.

FIG. 1 shows an image forming machine constructed in accordance with the invention. The illustrated image forming machine comprises a host computer 2, a printer 4 for printing the output of the host computer 2, a copying machine 6 for making a predetermined number of copies of a document which is a printed sheet printed by the printer 4, and a document supply device 5 for conveying the document printed by the printer to the copying machine 6.

The host computer 2 may be, for example, a personal computer, a word processor, or an image editing device for editing graphics on a CRT display. The host computer 2 transfers print data to the printer 4, and also transfers control data to the copying machine 6. Thus, the host computer 2 has individual setting means for setting the copy conditions, such as the number of documents, the size of the document, the number of copies, variable magnification, and the amount of exposure. These copy conditions can be entered from a keyboard, input means.

In the illustrated embodiment, the printer 4 is a small low-speed laser printer to be used as a printing device for a word processor or the like. The printer 4, as shown in FIG.

2, has a photoconductor drum 404 disposed nearly in the center of a housing 402 and having a photosensitive layer on the peripheral surface thereof. The photoconductor drum 404 is rotationally driven by drive means (not shown) in a direction shown by an arrow 404A. Around the photoconductor drum 404, a charging corona discharger 406, a laser unit 408, a developing device 410, a non-contact transfer roller 412, and a paper dust removal brush 414 are disposed in this order in the direction of rotation indicated by the arrow 404A. The printer 4 also has a sheet feed tray 416 for placing a transfer sheet. Downstream from this sheet feed tray 416, a sheet feed roller 418 is disposed, and a friction pad 420 for sheet separation is disposed at a position opposed to the sheet feed roller 418. Downstream from the photoconductor drum 404 and the transfer roller 412, a fixing roller pair 422 is disposed, and a discharge roller pair 424 is disposed downstream from the fixing roller pair 422. These rollers are rotationally driven in the directions of arrows by drive means (not shown). In the thus constructed printer 4, the photoconductor drum 404 is rotationally driven in the direction of the arrow 404A by drive means (not shown) in accordance with a print command from the host computer 2 to be described later. During this rotational driving, the photosensitive layer on the surface of the photoconductor drum 404 is charged substantially uniformly to a specific polarity by the charging corona discharger 406. The charged surface of the photosensitive layer of the photoconductor drum 404 is illuminated with a laser beam based on print data from the host computer 2 by the laser unit 408 to form a latent electrostatic image. The latent electrostatic image formed on the surface of the photosensitive layer of the photoconductor drum 404 is developed to a toner image by the developing device 410. Transfer sheets laid on the sheet feed tray 416 are fed one by one under the action of the sheet feed roller 418 and friction pad 420. The fed transfer sheet is conveyed through a guide path 426 into the gap between the photoconductor drum 404 and the transfer roller 412, whereby the toner image adhering to the photoconductor drum 404 is transferred onto its surface. The transfer sheet having the so transferred toner image is conveyed through a guide path 428 to the fixing roller pair 422. After the toner image is heat-fixed there, the transfer sheet having this fixed image is sent as a document by the discharge roller pair 424 from a discharge port 430 to the document supply device 5 to be described later.

Figure 2:
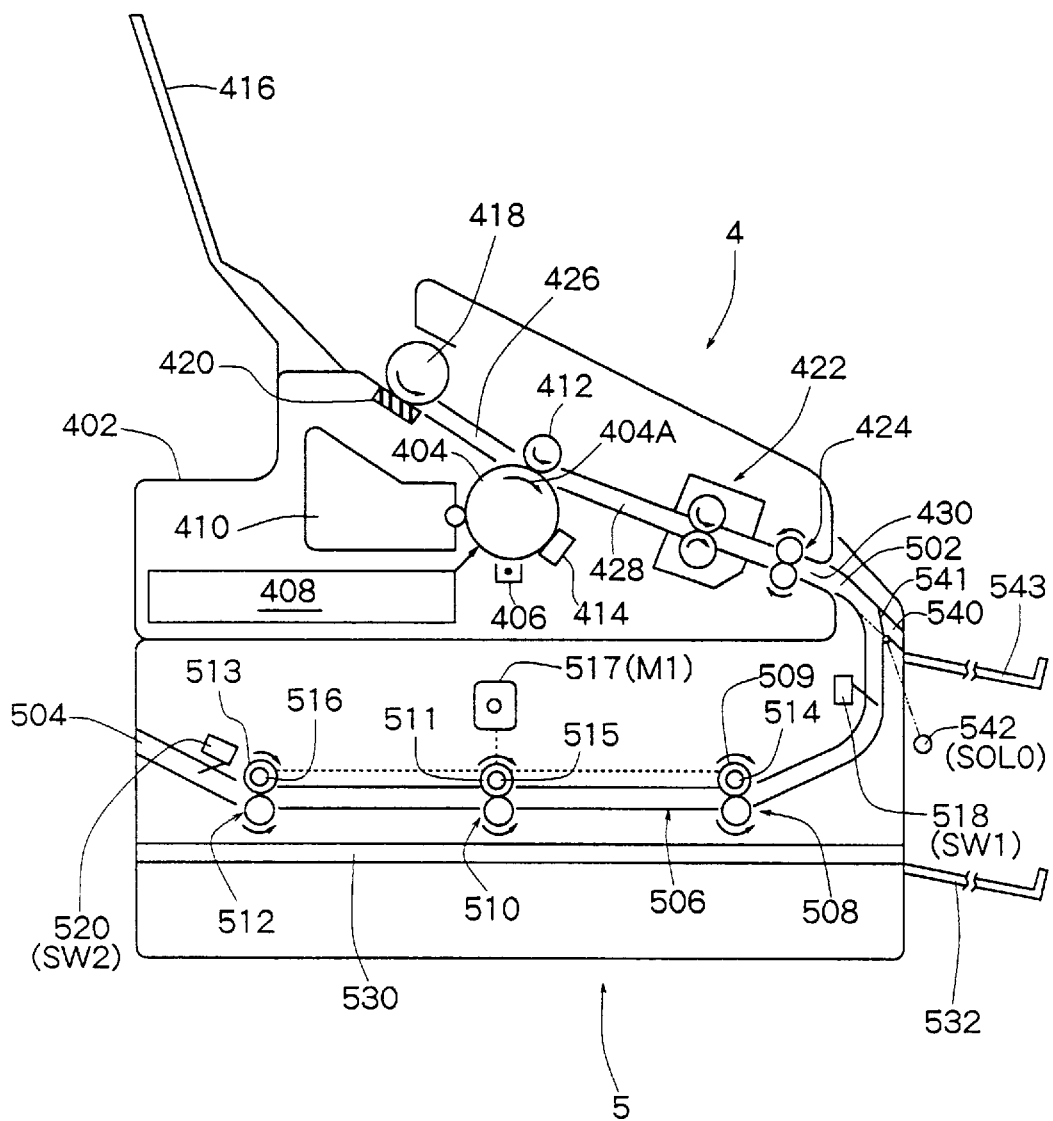
FIG. 2 is a schematic structural view of a printer and a document supply device which constitute the image forming machine shown in FIG. 1.

The document supply device 5 is disposed at an upper surface on one side (the right side in FIG. 1) of the copying machine 6. The document supply device 5 has a send-in port 502 provided at a position opposed to the discharge port 430 of the printer 4, a discharge port 504 provided at a position opposed to a send-in port of an automatic document feeder of the copying machine 6 to be described later, and a document transport path 506 formed between the send-in port 502 and the discharge port 504. Along the document transport path 506, three document transport roller pairs 508, 510, 512 are disposed in the illustrated embodiment. Drive rollers 509, 511, 513 of the three document transport roller pairs 508, 510, 512, respectively, are transmissively connected to an electric motor 517 (Ml) via a suitable power transmission mechanism so as to be rotationally driven in directions shown by arrows. In the illustrated embodiment, the drive rollers 509, 511, 513 of the document transport roller pairs 508, 510, 512, respectively, are transmissively connected to a power transmission mechanism (not shown) via one-way clutches 514, 515, 516, respectively. Between the send-in port 502 of the document transport path 506 and the upstream-side document transport roller pair 508, a document detector 518 (SW1) is disposed for detecting a document being sent from the discharge port 430 of the printer 4 into the document supply device 5. Between the discharge port 504 of the document transport path 506 and the downstream-side document transport roller pair 512, a document detector 520 (SW2) is disposed for detecting a document being supplied from the document supply device 5 to the automatic document feeder of the copying machine 6 to be described later. These document detectors 518 (SW1) and 520 (SW2) send their detection signals to control means of the copying machine 6 to be described later. The electric motor 517 (M1), the drive source for the document transport roller pairs 508, 510, 512, is adapted to have its rotational speed controlled by the control means of the copying machine 6 (to be described later) on the basis of detection signals from the document detectors 518 (SW1) and 520 (SW2). In the illustrated embodiment, a document return passageway 530 is provided below the document transport path 506. A document receiving tray 532 is disposed in connection with the exit of the document return passageway 530 at its right end in the drawing. In the illustrated embodiment, a document discharge path 540 is provided somewhat downstream from the send-in port 502 in the document transport path 506 so as to be connected to the send-in port 502. At a bifurcation of the document discharge path 540, a switching control plate 541 is disposed. The switching control plate 514 is adapted to be actuated by a solenoid 542 (SOLO). When the solenoid 542 (SOLO) is deenergized, the switching control plate 541 is located at a first position indicated by a solid line in FIG. 2. When the solenoid 542 (SOLO) is energized, the switching control plate 541 is located at a second position indicated by a two-dot chain line in FIG. 2. Thus, when the switching control plate 541 is brought to the first position, the document printed by the printer 4 and sent in through the send-in port 502 is conveyed to the automatic document feeder (to be described) of the copying machine 6 through the document transport path 506. When the switching control plate 541 is brought to the second position, on the other hand, the document printed by the printer 4 and sent in through the send-in port 502 is directly discharged to a document receiving tray 543 through the document discharge path 540. In the illustrated embodiment, therefore, the switching control plate 541 and the solenoid 542 (SOLO) constitute document discharge means for directly discharging the document printed by the printer 4.

Next, the copying machine 6 will be described. The copying machine 6 has a copying machine body 8, and an automatic document feeder 10 disposed on the top of the copying machine body 8.

Figure 3:
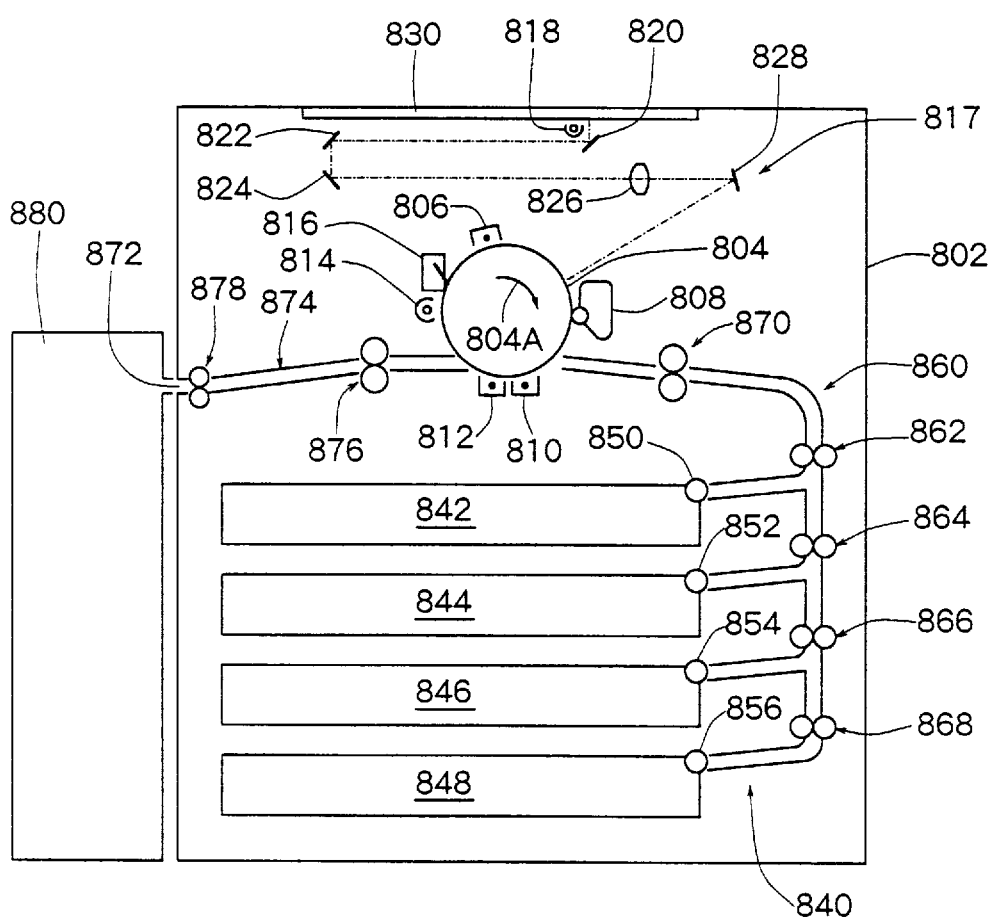
FIG. 3 is a schematic structural view of a copying machine body of a copying machine which constitutes the image forming machine shown in FIG. 1.

The copying machine body 8, as shown in FIG. 3, has a photoconductor drum 804 disposed nearly in the center of a housing 802 and having a photosensitive layer on the peripheral surface thereof. The photoconductor drum 804 is rotationally driven by drive means (not shown) in a direction shown by an arrow 804A. Around the photoconductor drum 804, a charging corona discharger 806, a developing device 808, a transfer corona discharger 810, a separating corona discharger 812, a static eliminator lamp 814, and a cleaning device 816 are disposed in this order in the direction of rotation indicated by the arrow 804A. The illustrated copying machine body 8 also includes an optical system 817 disposed above the photoconductor drum 804 and comprising an illumination lamp 818, a first mirror 820, a second mirror 822, a third mirror 824, a lens 826, and a fourth mirror 828. This optical system 817 is constructed such that a document placed on a transparent platen 830 disposed on the top of the housing 802 is illuminated by the illumination lamp 818, and a reflected-light image is focused onto the photoconductor drum 804 via the first mirror 820, second mirror 822, third mirror 824, lens 826, and fourth mirror 828.

Below the photoconductor drum 804, transfer sheet supply means 840 is disposed. The illustrated transfer sheet supply means 840 includes four transfer sheet cassettes 842, 844, 846, 848. These transfer sheet cassettes 842, 844, 846, 848 accommodate transfer sheets of sizes different from each other. At upper parts of the front ends (the right-side ends in FIG. 3) of the transfer sheet cassettes 842, 844, 846, 848, transfer sheet delivery rollers 850, 852, 854, 856, respectively, are disposed for sending out the transfer sheets accommodated in the corresponding cassettes. The transfer sheets sent off by the transfer sheet delivery rollers 850, 852, 854, 856 are conveyed to a transfer sheet feeding channel 860. Along the transfer sheet feeding channel 860, transport roller pairs 862, 864, 866, 868 are disposed. A resist roller pair 870 is disposed downstream of these transport roller pairs and upstream of a transfer zone where the transfer corona discharger 810 is disposed. A transfer sheet transport channel 874 is formed between a separation zone, where the separating corona discharger 812 is disposed, and a transfer sheet discharge port 872 provided in the housing 802. Along the transfer sheet transport channel 874, a fixing roller pair 876 and a discharge roller pair 878 are disposed. These roller pairs are rotationally driven by drive means (not shown).

The copying machine body 8 constructed as above works in the following manner: The photoconductor drum 804 is rotationally driven in the direction of an arrow 804A by drive means (not shown). During this motion, the photosensitive layer of the photoconductor drum 804 is charged to a specific polarity by the charging corona discharger 806 disposed in a charging zone. The photosensitive layer of the photoconductor drum 804, charged to the specific polarity by the charging corona discharger 806, is scan-exposed by the optical system 817 to the image of a document placed on the transparent platen 830, thereby forming a latent electrostatic image. The latent electrostatic image formed in the photosensitive layer of the photoconductor drum 804 is developed to a toner image by the developing device 808. The toner image so formed in the photosensitive layer of the photoconductor drum 804 is transferred by the action of the transfer corona discharger 810 onto the surface of a transfer sheet conveyed to the transfer zone by the transfer sheet supply means 840. The transfer sheet having the transferred toner image is separated from the photoconductor drum 804 by the action of the separating corona discharger 812, and is then conveyed to the fixing roller pair 876, where the toner image is heat-fixed. The transfer sheet having the toner image transferred and heat-fixed in this manner is discharged by the discharge roller pair 878 from the transfer sheet discharge port 872 to a sorter 880. The photosensitive layer of the photoconductor drum 804 having passed the transfer zone and the separation zone, on the other hand, is statically eliminated by the static eliminator lamp 814, and is further cleaned of remaining toner by the cleaning device 816.

In the illustrated embodiment, an electrostatic copying machine has been exemplified as the copying machine 6, but other type of copying machine may be used. For example, there may be used a copying machine with such a printing function that a latent electrostatic image formed on the surface of a photoconductor drum is developed to form a toner image, this toner image is fixed onto the surface of the photoconductor drum to form a print master, and the print master is used to transfer a developed image onto a predetermined sheet.

Next, the automatic document feeder 10 will be described with reference to FIG. 4. A document restraining member 832 is disposed on one side of the transparent platen 830 (the left side in FIG. 4) disposed on the top of the copying machine body 8. On the other side of the transparent platen 830 (the right side in FIG. 4), a stationary mounting member 834 is disposed. The document restraining member 832 is mounted so as to be pivotable between an operating position indicated by a solid line in FIG. 4 and a descent position indicated by a two-dot chain line in FIG. 4. When the document restraining member 832 is located at the operating position, its front end (the right edge in FIG. 4) is protruded slightly above the top of the transparent platen 830. When the document restraining member 832 is located at the descent position, its front end is lowered below the top of the transparent platen 830. The document restraining member 832 is adapted to be actuated by a solenoid 836 (SOL1). When the solenoid 836 (SOL1) is deenergized, the document restraining member 832 is located at the operating position. When the solenoid 836 (SOL1) is energized, the document restraining member 832 is brought to the descent position.

The automatic document feeder 10 is mounted on the top of the housing 802 of the copying machine body 8 so as to be pivotable about a pivot axis extending along the rear side edge of the transparent platen 830. When a document is to be placed manually on the transparent platen 830 of the copying machine body 8, the automatic document feeder 10 is pivoted upward from the illustrated closed position to an open position to expose the transparent platen 830 to the outside. Then, the document is placed at a required position on the transparent platen 830, and the automatic document feeder 10 is brought to the illustrated closed position to cover the transparent platen 830 and the document placed thereon. In laying the document on the transparent platen 830, one can set the document at the required position by bringing one edge of the document into contact with the front edge of the document restraining member 832 located at the operating position. When the automatic document feeder 10 is used to send the document automatically onto the transparent platen 830 and send it out automatically from there, the automatic document feeder 10 is used in a condition in which it is put to the closed position.

Figure 4:
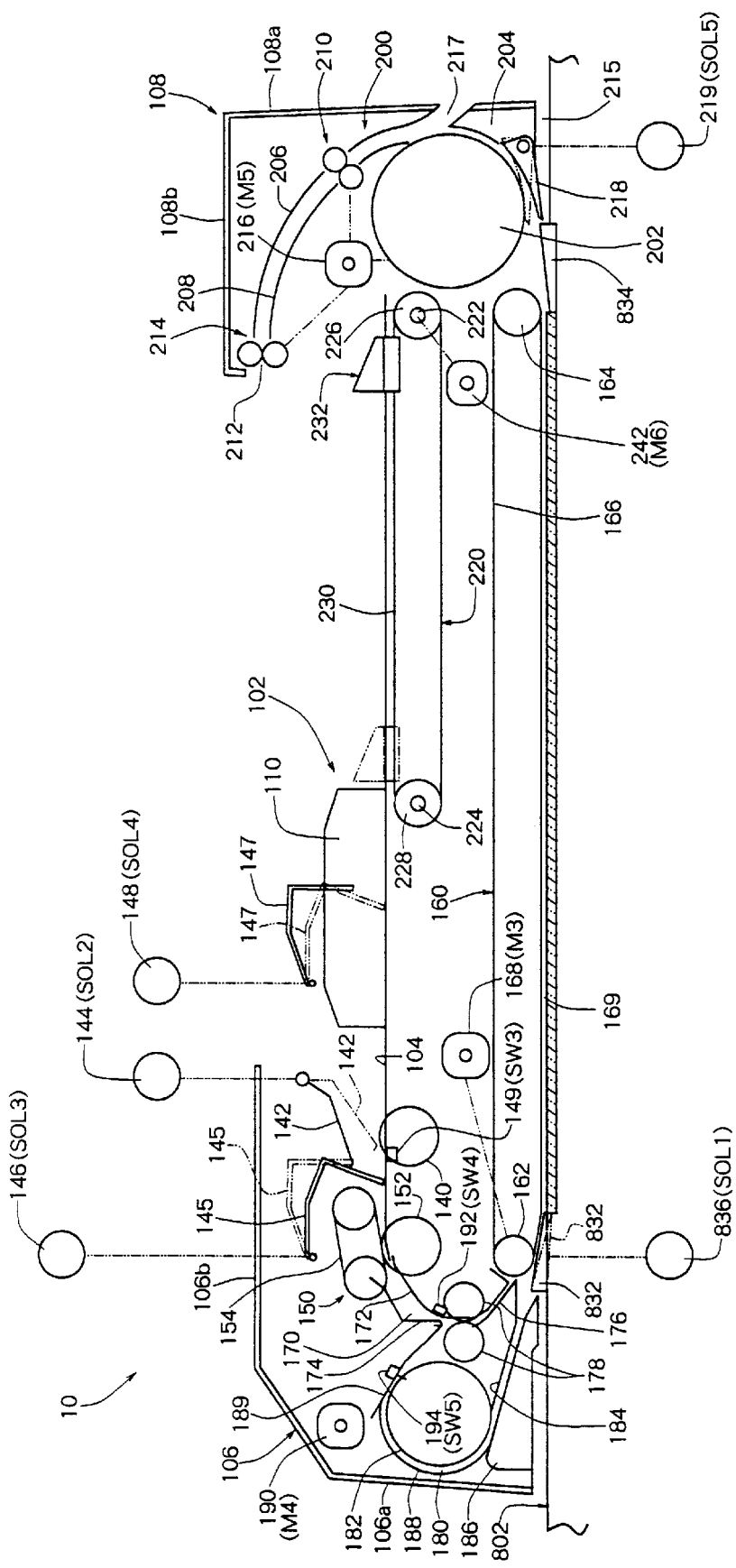
FIG. 4 is a sectional view of an automatic document feeder provided in the copying machine which constitutes the image forming machine shown in FIG. 1.

Further with reference to FIG. 4, the illustrated automatic document feeder 10 includes document stand means 102 disposed between a front side cover and a rear side cover (not shown) disposed with spacing in a back-and-forth direction (the direction perpendicular to the sheet face in FIG. 4). This document stand means 102 is defined by a stationary plate 104 of a plastic material extending substantially horizontally. A left end portion cover 106 is disposed between left end portions of the front side cover and the rear side cover, while a right end portion cover 108 is disposed between right end portions of the front and rear side covers. The left end portion cover 106 has a left end wall portion 106a covering the left end surface of the automatic document feeder 10, and a top panel wall portion 106b extending above a downstream portion of the document stand means 102. The right end portion cover 108 has a right end wall portion 108a covering the right end surface of the automatic document feeder 10, and a top panel wall portion 108b extending leftward from the upper end of the right end wall portion 108a.

Figure 5:
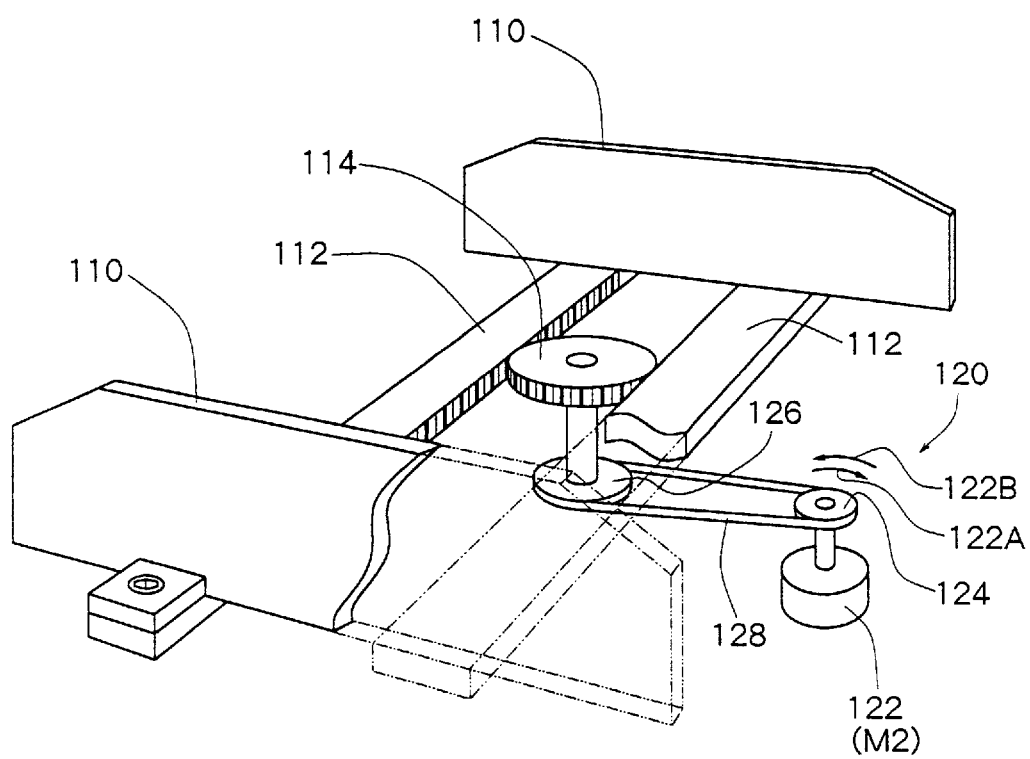
FIG. 5 is a perspective view showing a width regulating cursor and cursor actuating means which constitute document stand means provided in the automatic document feeder shown in FIG. 4.

The document stand means 102 has a pair of width regulating cursors 110, 110 mounted in the center of the stationary plate 104 so as to be movable widthwise. The pair of width regulating cursors 110, 110 are coupled to racks 112, 112 below the stationary plate 104 as shown in FIG. 5. The racks 112, 112 each engage a pinion 114, so that the pair of width regulating cursors 110, 110 mounted on the racks 112, 112 are moved toward and away from each other in an interlocked manner. In the illustrated embodiment, cursor actuating means 120 is provided for actuating the pair of width regulating cursors 110, 110. The cursor actuating means 120 comprises an electric motor 122 (M2) such as a pulse motor, a toothed drive pulley 124 mounted on the output shaft of the electric motor 122 (M2), and a timing belt 128 wound between the toothed drive pulley 124 and a toothed drive pulley 126 mounted on a shaft to which the pinion 114 has been attached. In the so constructed cursor actuating means 120, when the electric motor 122 (M2) is rotationally driven in a direction of an arrow 122A, the pair of width regulating cursors 110, 110 are moved toward each other. When the electric motor 122 (M2) is rotationally driven in a direction of an arrow 122B, the pair of width regulating cursors 110, 110 are moved away from each other. When the electric motor 122 (M2) has been deenergized, the pair of width regulating cursors 110, 110 can be moved manually.

Downstream from the pair of width regulating cursors 110, 110, an opening is formed in the stationary plate 104, and a rotatably disposed feed roller 140 is protruded upward from the opening. As shown in FIG. 4, a press member 142 is disposed above the stationary plate 104 in association with the feed roller 140. The press member 142 is adapted to be actuated by a solenoid 144 (SOL2). When the solenoid 144 (SOL2) is deenergized, the press member 142 is located at an ascent position indicated by a solid line in FIG. 4. When the solenoid 144 (SOL2) is energized, on the other hand, the press member 142 is resiliently urged counterclockwise in FIG. 4 to press a document placed on the stationary plate 104 against the feed roller 140. Downstream from the press member 142, a document setting stopper 145 is disposed above the stationary plate 104. The document setting stopper 145 is adapted to be actuated by a solenoid 146 (SOL3). When the solenoid 146 (SOL3) is deenergized, the document setting stopper 145 is located at a stop position indicated by a solid line in FIG. 4. When the solenoid 146 (SOL3) is energized, on the other hand, the document setting stopper 145 is brought to a retreat position indicated by a two-dot chain line in FIG. 4. Upstream from the press member 142, a discharged document front end position regulating member 147 is also disposed above the stationary plate 104. The discharged document front end position regulating member 147 is adapted to be actuated by a solenoid 148 (SOL4). When the solenoid 148 (SOL4) is deenergized, the discharged document front end position regulating member 147 is located at a retreat position indicated by a solid line in FIG. 4. When the solenoid 148 (SOL4) is energized, on the other hand, the discharged document front end position regulating member 147 is brought to a regulating position indicated by a two-dot chain line in FIG. 4. The so constructed press member 142, document setting stopper 145, and discharged document front end position regulating member 147 are actuated in the following manner according to the state of operation of the automatic document feeder 10: When a document is to be set on the stationary plate 104, the document setting stopper 145 is brought to the stop position, and the press member 142 and the discharged document front end position regulating member 147 are put to the ascent position and the retreat position, respectively. When the document is set on the stationary plate 104 and a copy action is started, the document setting stopper 145 is brought to the retreat position, and the press member 142 presses the document placed on the stationary plate 142. Simultaneously, the discharged document front end position regulating member 147 is located at the regulating position. Between the document setting stopper 145 and the discharged document front end position regulating member 147 placed on the stationary plate 104, a hole is provided. Below this hole, a reflection-type document detector 149 (SW3) is disposed for detecting whether or not a document is placed on the stationary plate 104 of the document stand means 102.

Downstream from the feed roller 140, document separating means 150 is disposed. The document separating means 150 is composed of a separating roller 152 protruding upwardly through a notch formed in the stationary plate 104, and a separating belt mechanism 154 disposed opposite and above the separating roller 152. The separating roller 152 is rotationally driven counterclockwise in FIG. 4, while the separating belt mechanism 154 is rotationally driven counterclockwise in FIG. 4 via a one-way rotating clutch (not shown). The so constructed document separating means 150 prevents the feed of two or more documents from a stack of documents placed on the document stand means 102, and conveys only the bottom-most document.

Further referring to FIG. 4, a conveyor belt mechanism 160 is disposed below the document stand means 102. The conveyor belt mechanism 160 constituting conveying means includes a drive roller 162 and a driven roller 164 disposed with spacing in the conveying direction (the right-and-left direction in FIG. 4), and an endless belt 166 looped over these rollers. The drive roller 162 is rotationally driven by an electric motor 168 (M3). A lower travel portion of the endless belt 166 extends along the transparent platen 830 of the copying machine body 8, and a document transport path 169 is defined between this lower travel portion and the transparent platen 830. Between the document transport path 169 and the document stand means 102, a document send-in path 170 is formed. The document send-in path 170 is defined between an inner guide plate 172 and outer guide plates 174, 176. Beside the document send-in path 170, a send-in roller pair 178 is disposed which, together with the feed roller 140 and the document separating means 150, constitutes document send-in means for sending the document on the document stand means 102 into the document transport path 169 through the document send-in path 170. In the illustrated embodiment, a document inversion mechanism 180 is provided for inverting the face and back of the document sent into the document transport path 169. The document inversion mechanism 180 has a document inversion path 181 disposed on the left of the document send-in path 170. The document inversion path 181 is defined between an inversion roller 182, which is rotationally driven clockwise in FIG. 4, and an inner guide plate 184 and outer guide plates 186, 188 and 189. The feed roller 140, document separating means 150, send-in roller pair 178, and inversion roller 182 are transmissively connected to an electric motor 190 (M4) via a power transmission mechanism (not shown). Immediately upstream of the send-in roller pair 178 beside the document send-in path 170 and on the document inversion path 181, a document detector 192 (SW4) and a document detector 194 (SW5) are disposed, respectively.

On the right of the document transport path 169, a document send-out path 200 is formed. The document send-out path 200 is defined between a send-out roller 202, which is rotationally driven counterclockwise in FIG. 4, and outer guide plates 204, 206 and an inner guide plate 208. At an intermediate portion of the document send-out path 200, a transport roller pair 210 is disposed. At the downstream end of the document send-out path 200, a document discharge port 212 is formed. Immediately upstream of the document discharge port 212, a document discharge roller pair 214 is disposed. The send-out roller 202, transport roller pair 210 and document discharge roller pair 214 are adapted to be rotationally driven by an electric motor 216 (M5). Upstream of the transport roller pair 210 in the document send-out path 200, a document send-in port 217 is provided. The document send-in port 217 is formed to be opposed to the discharge port 504 of the document supply device 5. Thus, the document that has been printed by the printer 4, conveyed by the document supply device 5, and discharged from the discharge port 504 is sent into the document send-out path 200 from the document send-in port 217. By the action of the transport roller pair 210 and document discharge roller pair 214, the document is then discharged onto the stationary plate 104 of the document stand means 102 of the automatic document feeder 10. On the entrance side of the document send-out path 200, a switching control plate 218 is disposed. The switching control plate 218 is adapted to be actuated by a solenoid 219 (SOL5). When the solenoid 219 (SOL5) is deenergized, the switching control plate 218 is located at a first position indicated by a solid line in FIG. 4. When the solenoid 219 (SOL5) is energized, the switching control plate 218 is located at a second position indicated by a two-dot chain line in FIG. 4. Thus, when the switching control plate 218 is brought to the first position, the document conveyed by the conveyor belt mechanism 160 is sent to the document send-out path 200. When the switching control plate 218 is brought to the second position, on the other hand, the document conveyed by the conveyor belt mechanism 160 is conveyed to the document receiving tray 532 through a bypass path 215 and the document return passageway 530 provided in the document supply device 5. In the illustrated embodiment, therefore, the conveyor belt mechanism 160, the switching control plate 218, the solenoid 219 (SOL5), and the bypass path 215 constitute document discharge means for discharging the document exposed on the transparent platen 830 to the outside of the automatic document feeder. The switching control plate 218 is normally located at the first position when the copying machine is used stand-alone, and located at the second position in the print/copy mode.

Figure 6:
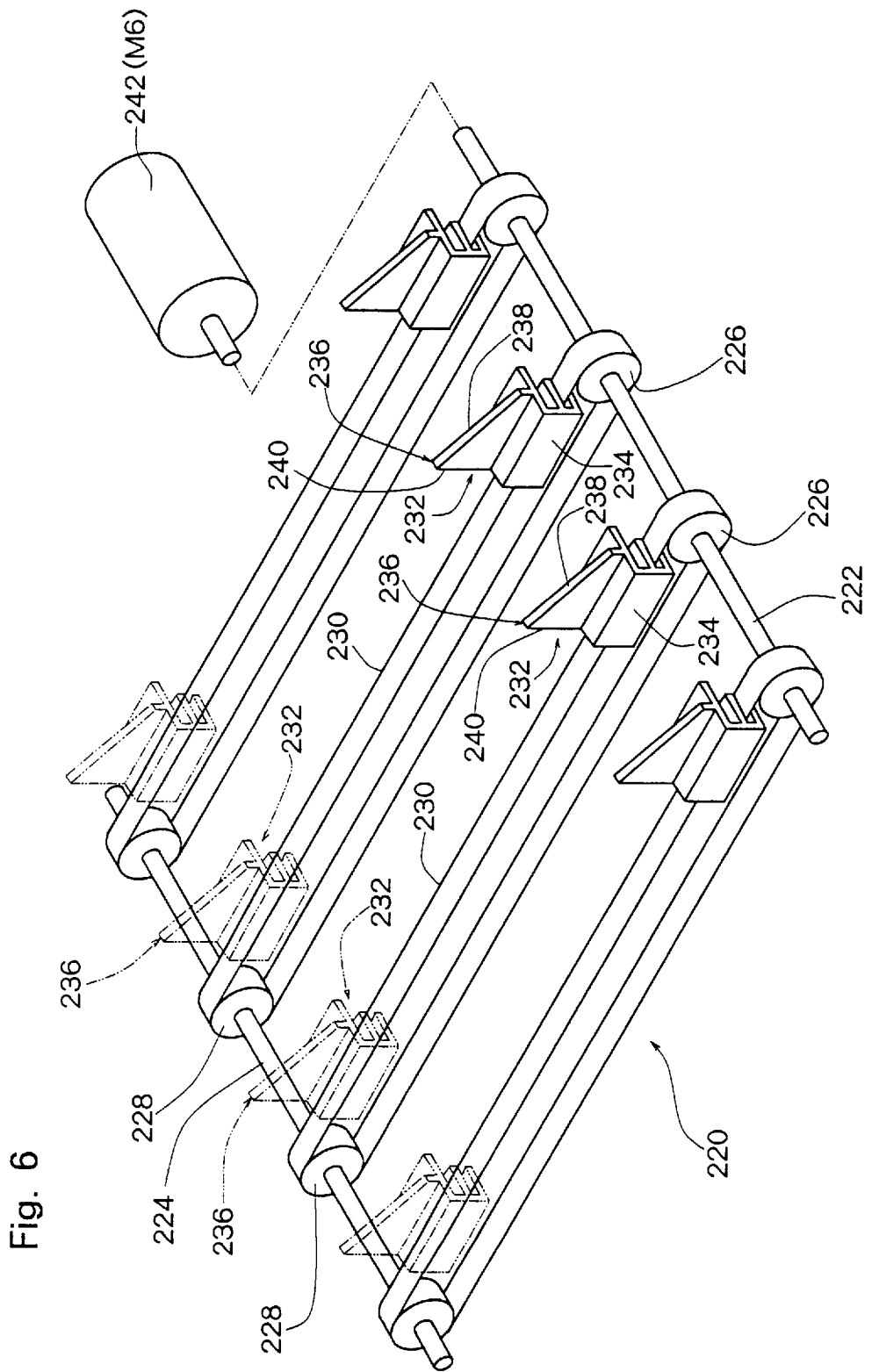
FIG. 6 is a perspective view showing a document moving mechanism provided in the automatic document feeder shown in FIG. 4.

The automatic document feeder 10 in the illustrated embodiment has a document moving mechanism 220 in association with the document discharge port 212. The document moving mechanism 220 is disposed below the document discharge port 212 and the stationary plate 104 disposed downstream therefrom. Referring to FIG. 6, the document moving mechanism 220 includes a drive shaft 222 and a driven shaft 224 mounted rotatably with spacing in the document conveying direction. To the drive shaft 222, four pulleys 226 are fixed with suitable spacing in the axial direction thereof. Likewise, four pulleys 228 are fixed to the driven shaft 224 with suitable spacing in the axial direction thereof. Over each pair of the pulleys 226 and 228, an endless belt 230 is wound. To the upper travel portion of each of the endless belts 230, a protruding member 232 is fixed. Each of the protruding members 232 has a base portion 234 fixed to the endless belt 230, and a protruding main portion 236 projecting upwards from the base portion 234. The upstream upper surface 238 of the protruding main portion 236 of each of the protruding members 232 is inclined upwards toward the downstream side at an angle of inclination of, say, about 45 degrees. On the downstream side of the protruding main portion 236 of each of the protruding members 232, there is formed a cliffed surface 240 which may be substantially vertical. The drive shaft 222 is transmissively connected to an electric motor 242 (M6) via a suitable power transmission mechanism. When rotationally driven, where necessary, in normal and reverse directions of rotation, the drive shaft 222 drives the endless belt 230, thereby moving the protruding member 232 in a suitable reciprocating manner between a receding position indicated by a solid line and a foremost advancing position indicated by a two-dot chain line in FIGS. 4 and 6 in accordance with the size of the document. The stationary plate 104 has four slits (not shown) extending in the conveying direction with spacing in the width direction (the direction perpendicular to the sheet face in FIG. 4) for permitting the reciprocating movement of the protruding members 232. At the above-mentioned receding position, the protruding member 232 is positioned upstream of the document discharge port 212. When the protruding member 232 is caused to move forward from the receding position toward the downstream side, the protruding main portion 236 of the protruding member 232 is advanced while projecting upwards through the slit formed in the stationary plate 104. Thus, the protruding main portion 236 of the protruding member 232 acts on the rear edge of the stack of documents discharged through the document discharge port 212 and accumulated on the stationary plate 104 to advance the document stack downstream.

Figure 7:
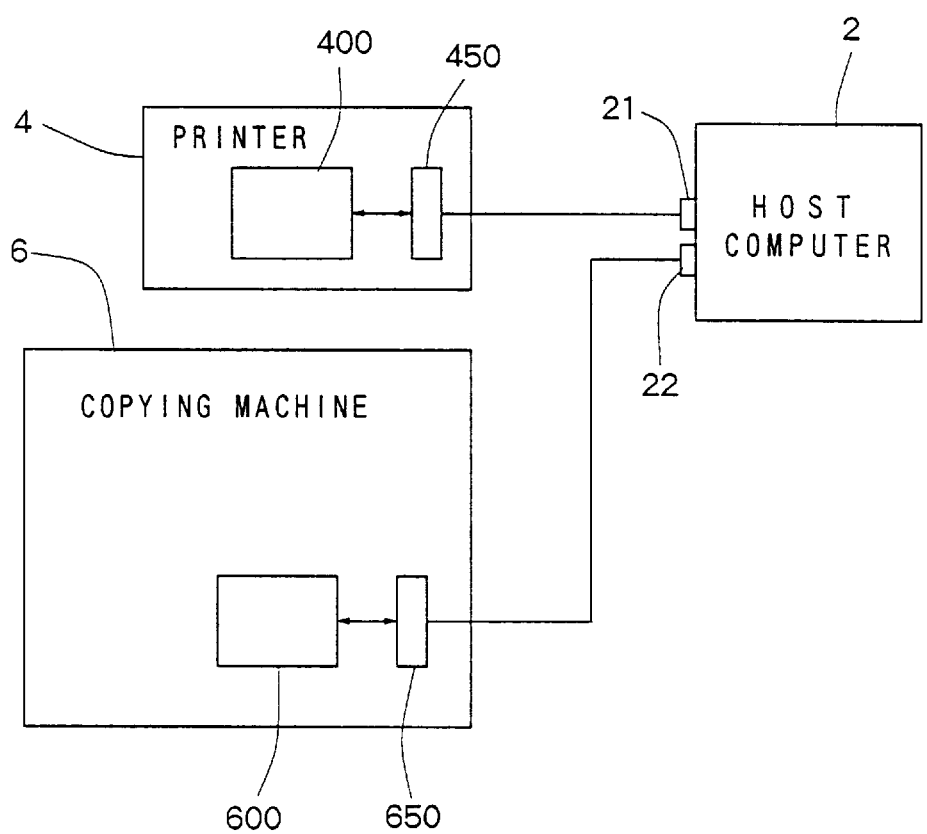
FIG. 7 is a block diagram showing the relation of connection of a host computer, the printer and the copying machine which constitute the image forming machine shown in FIG. 1.

Next, the manner of connection of the host computer 2 to the control means provided in the printer 4 and the copying machine 6 will be described by reference to FIG. 7. Control means 400 provided in the printer 4 is connected to a parallel port 21 of the host computer 2 via a Centronics interface, a parallel data transfer type interface 450. Control means 600 provided in the copying machine 6, on the other hand, is connected to a serial port 22 of the host computer 2 via RS-232-C, a serial data transfer type interface 650.

Figure 8:
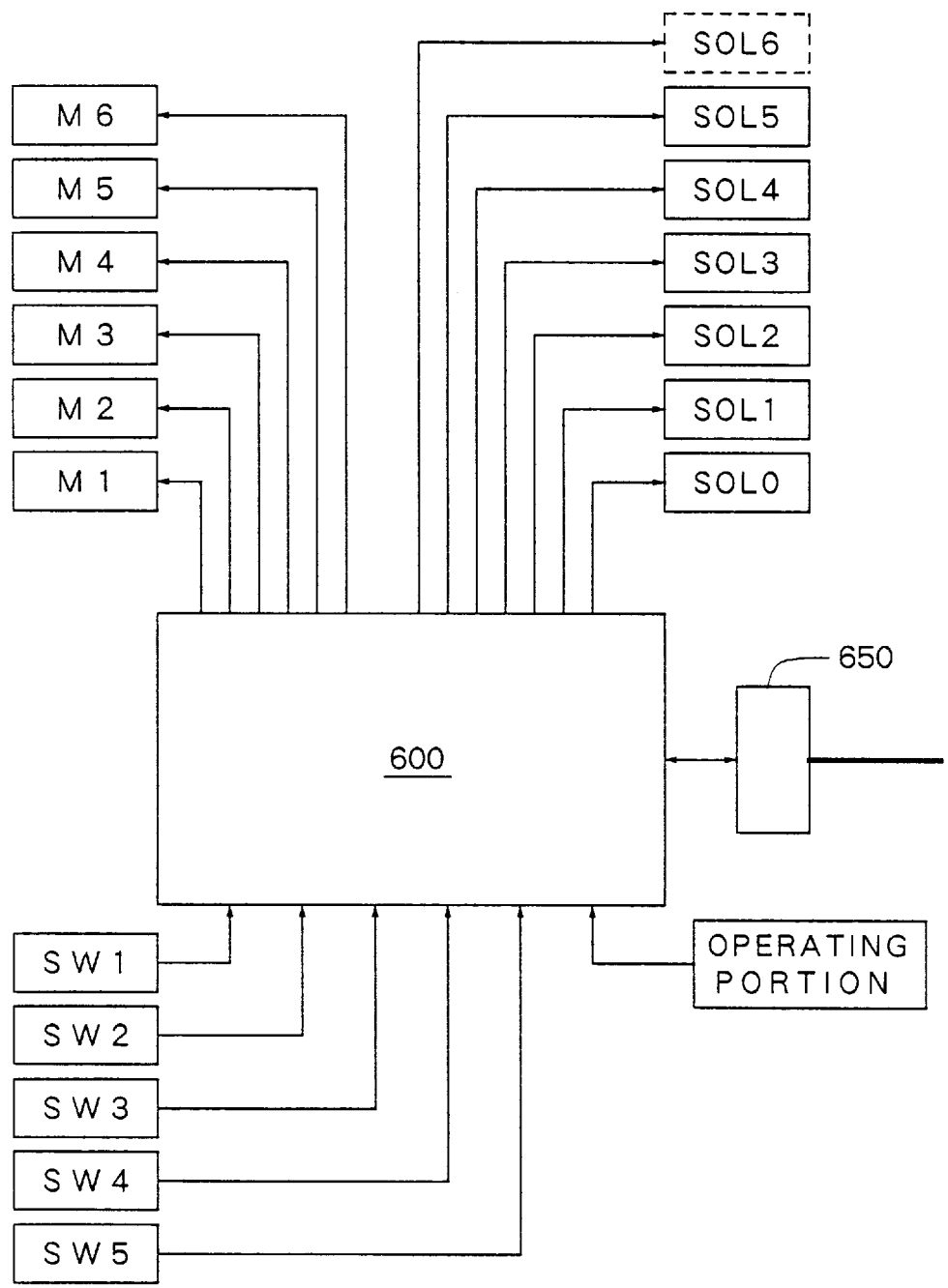
FIG. 8 is a block diagram showing control means of the copying machine shown in FIG. 7.
Figure 9:
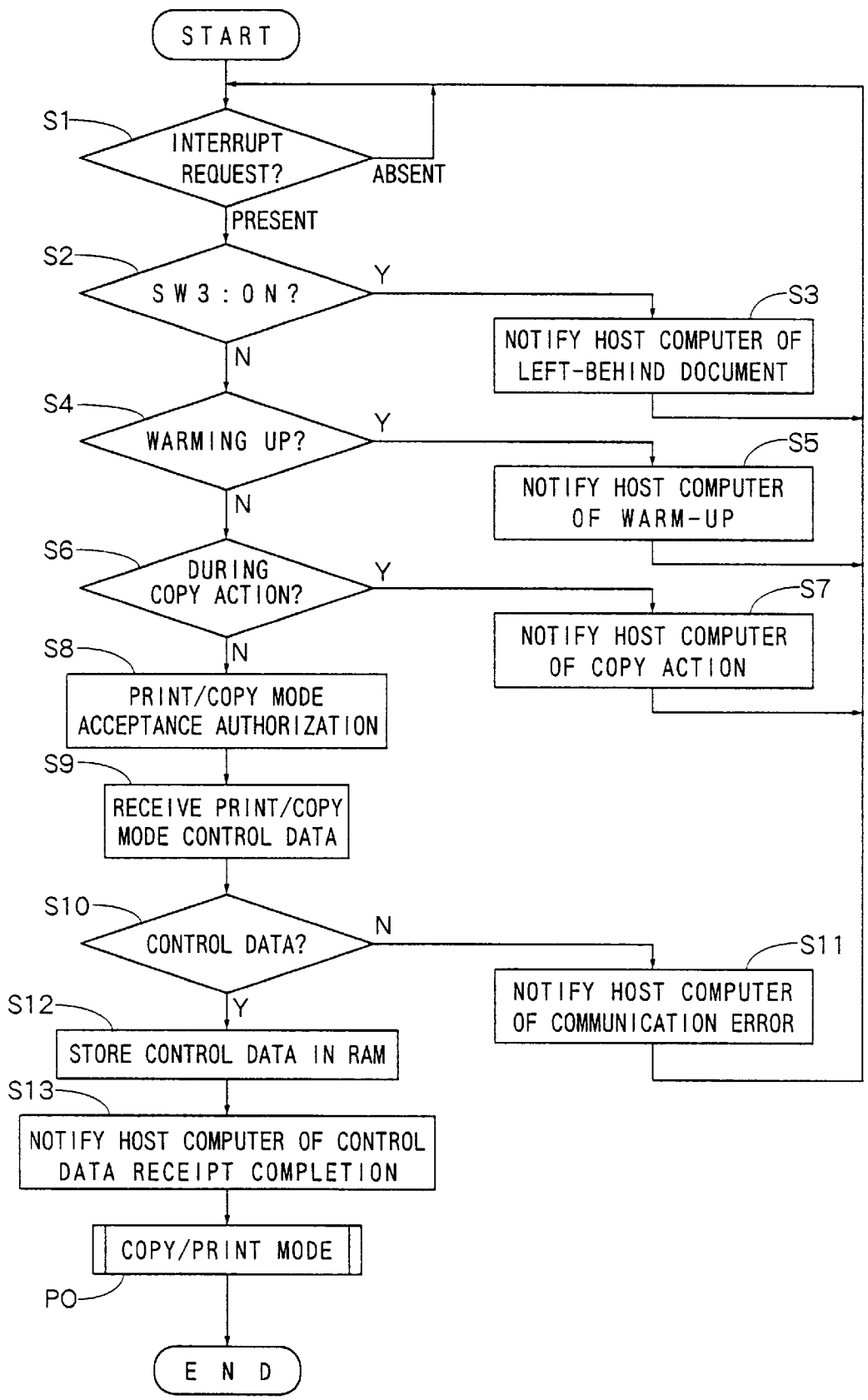
FIG. 9 is a flow chart showing an embodiment of a main routine for the operating procedure of the control means of the copying machine shown in FIG. 7

The control means 600 of the copying machine 6 will now be described with reference to FIG. 8. The control means 600 is constituted by a microcomputer, and has a central processing unit (CPU) for performing operations according to a control program, a read-only memory (ROM) for storing the control program, a random access memory (RAM) for storing the results of operations and being capable of reading and writing, a timer (T), and a counter (C). The so constituted control means 600 receives signals from the document detectors 518 (SW1) and 520 (SW2) disposed in the document supply device 5; the document detector 149 (SW3) for detecting whether or not the document is placed on the stationary plate 104 of the document stand means 102; the document detectors 192 (SW4) and 194 (SW5) disposed on the document send-in path 170 and the document inversion path 181, respectively; and an operating portion disposed on the top of the copying machine 6; as well as control signals from the host computer 2. Based on these input signals, the control means 600 puts out control signals to the electric motors 517 (M1), 122 (M2), 168 (M3), 190 (M4), 216 (M5) and 242 (M6), and the solenoids 542 (SOLO), 836 (SOL1), 144 (SOL2), 146 (SOL3), 148 (SOL4) and 219 (SOL5).

The illustrated image forming machine is constructed as above. A first embodiment of its actions will be described with reference to flow charts shown in FIGS. 9 to 13.

The description will be made of cases in which edit work is completed in the host computer 2, the edited image is printed by the printer 4, and the print as a document is copied as a predetermined number of copies by the copying machine 6. The operator executes "print" from the keyboard 21 of the host computer 2. The host computer 2 makes a print/copy request to the copying machine. This print/copy request results in an interrupt request made to the control means 600 of the copying machine 6 via RS-232-C, the serial data transfer type interface 650. The actions of the control means 600 of the copying machine 6 that has received the interrupt request for print/copy from the host computer 2 will be described on the basis of FIG. 9.

The control means 600 checks the print/copy interrupt request from the host computer 2 (step S1). When the interrupt request has existed, it goes to step S2 to check whether the document detector 149 (SW3) for detecting the placement of a document on the stationary plate 104 of the document stand means 102 is ON or not, namely, whether or not there is a left-behind document on the document stand means 102 that the operator forgot to withdraw upon completion of a preceding copy action. If the document detector 149 (SW3) is ON, that is, a left-behind document is present on the document stand means 102, the control means 600 goes to step S3 to notify the host computer 2 of its presence. When the document detector 149 (SW3) is not ON at the step S2, the control means 600 judges that no left-behind document is present on the document stand means 102. The control means 600 goes to step S4 to check whether the copying machine 6 is warming up or not. A judgment of the warm-up is made, for example, by determination of whether the fixing roller pair 876 has reached a predetermined temperature. When the copying machine 6 is in the warm-up, the control means 600 proceeds to step S5 to notify the host computer 2 of the warm-up. If the copying machine 6 is not under warm-up at step S4, the control means 600 goes to step S6 to check whether the copying machine 6 is in a copy action. When the copying machine 6 is doing a copy action, the control means 600 goes to step S7 to notify the host computer 2 of the copy action. If the copying machine 6 is doing no copy action at step S6, the control means 600 proceeds to step S8, sending a print/copy mode acceptance authorization signal to the host computer 2. Then, the control means 600 goes to step S9, receiving print/copy mode control data from the host computer 2. This print/copy mode control data covers the copy conditions such as the number of documents, the size of the document, the number of copies, variable magnification, and the amount of exposure. After receiving the control data in the print/copy mode from the host computer 2 at step S9, the control means 600 goes to step S10 to make sure that the received data is control data. If the received data is print data or the like, rather than control data, the control means 600 proceeds to step S11 to notify the host computer 2 of a communication error. When the data received from the host computer 2 at step S10 is control data, the control means 600 goes to step S12, storing the received control data into the built-in random access memory (RAM). Then, the control means 600 proceeds to step S13, notifying the host computer 2 that the receipt of control data has been completed. The control means 600 further proceeds to step P0 to execute an action in the copy/print mode.

Figure 13:
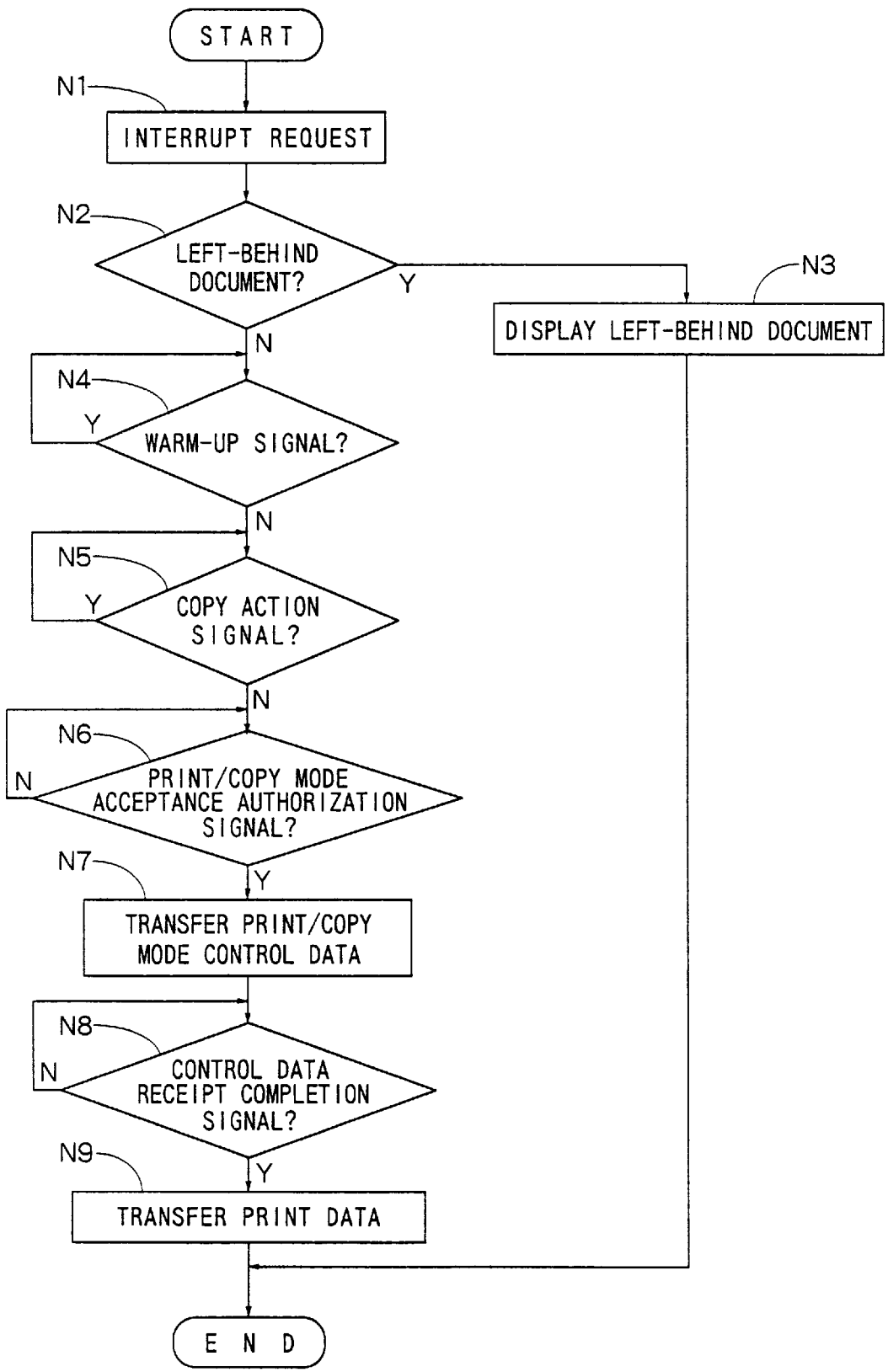
FIG. 13 is a flow chart showing an embodiment of the operating procedure of the host computer shown in FIG. 7.

Next, the actions of the host computer 2 will be described with reference to FIG. 13.

When the operator executes "print" from the keyboard 21 of the host computer 2 in the aforementioned manner, the host computer 2 makes a print/copy request to the copying machine (step N1). Then, the host computer 2 goes to step N2, checking whether or not there is a left-behind document signal from the control means 600 of the copying machine 6. If a left-behind document signal exists, the host computer 2 goes to step N3, showing its existence on the display. From this display, the operator can know the presence of the left-behind document on the document stand means 102. Based on this alarm display, the operator removes the left-behind document on the document stand means 102, and executes "print" from the keyboard 21 of the host computer 2 again. In case the left-behind document on the document stand means 102 is removed after the alarm on the left-behind document, and a left-behind document signal is not transmitted from the control means 600 of the copying machine 6 any more, the host computer 2 may be adapted to dismiss the left-behind document display on the display, and return to the step N1. If, at the step N2, there is no left-behind document signal from the control means 600 of the copying machine 6, the host computer 2 goes to step N4, checking for a warm-up signal from the control means 600 of the copying machine 6. In the presence of the warm-up signal, the host computer 2 enters the wait state. In the absence of the warm-up signal, the host computer 2 goes to step N5, checking for a copy action signal from the control means 600 of the copying machine 6. In the presence of the copy action signal at step 5, the host computer 2 enters the wait state. In the absence of the copy action signal, the host computer 2 goes to step N6, checking whether or not a print/copy mode acceptance authorization signal has been sent from the control means 600 of the copying machine 6. In the absence of the print/copy mode acceptance authorization signal at step N6, the host computer 2 enters the wait state. In the presence of the print/copy mode acceptance authorization signal, the host computer 2 goes to step N7, transferring the control data to the control means 600 of the copying machine 6. Then, the host computer 2 goes to step N8, checking whether or not a control data receipt completion signal has been sent from the control means 600 of the copying machine 6. In the absence of the control data receipt completion signal, the host computer 2 enters the wait state. In the presence of the control data receipt completion signal, the host computer 2 goes to step N9, transferring print data to the control means 400 of the printer 4 via the parallel data transfer type interface 450.

The action in the copy/print mode will be described based on a flow chart shown in FIG. 10.

The control means 600 of the copying machine 6 that has moved into the print/copy mode executes at step P1 the alignment control of the pair of width regulating cursors 110, 110 in the document stand means 102. This alignment control is performed by actuating the electric motor 122 (M2) comprising a pulse motor, the drive source of the cursor actuating means 120, on the basis of a document size signal received from the host computer 2 at step S7. That is, the electric motor 122 (M2) is rotationally driven in the direction of arrow 122B to separate the pair of width regulating cursors 110, 110 maximally from each other. Then, predetermined pulses corresponding to the size of the document are given to the electric motor 122 (M2) for its rotational driving in the direction of arrow 122A, whereby the pair of width regulating cursors 110, 110 are positioned at predetermined positions corresponding to the document size. Then, the control means 600 moves to step P2, checking whether the document detector 518 (SW1) disposed in the document supply device 5 is ON or not. If it is not ON, the control means 600 enters the wait state, since the document printed by the printer 4 has not reached the document detector 518 (SW1). When it is ON, it is decided that the document printed by the printer 4 has been sent into the document transport path 506 of the document supply device 5. The control means 600 goes to step P3 to drive the electric motor 517 (M1) of the document supply device 5. The rotational speed of the electric motor 517 (M1) at this moment is a rotational speed (V1) at which the peripheral speed (transport speed) of the document transport roller pairs 508, 510, 512 driven by the electric motor 517 (M1) is equal to the conveying speed of the document conveyed by the printer 4. When the electric motor 517 (M1) is driven at the rotational speed (V1), the control means 600 goes to step P4 to check whether the document detector 520 (SW2) is ON or not. If the document detector 520 (SW2) is not ON, the control means 600 enters the wait state, since the document sent into the document supply device 5 has not reached the document detector 520 (SW2). When it is ON, a decision is made that the document has reached the document detector 520 (SW2). The control means 600 proceeds to step P5 to change the rotational speed of the electric motor 517 (Ml) to (V2). This rotational speed (V2) is set to be greater than the rotational speed (V1). This is because the conveying speed of the automatic document feeder 10 is much higher than the conveying speed of the document conveyed by the printer 4, thus arousing the necessity of minimizing the difference between the conveying speed of the document conveyed from the document supply device 5 to the automatic document feeder 10 and the conveying speed of the automatic document feeder 10. After changing the rotational speed of the electric motor 517 (M1) to (V2) in this manner, the control means 600 goes to step P6 to drive the electric motor 216 (M5), the drive source for the send-out roller 202, etc. of the automatic document feeder 10. By driving the electric motors 517 (M1) and 216 (M5) in this manner, the document printed by the printer 4 and sent into the document supply device 5 is conveyed by the document transport roller pairs 508, 510, 512, and fed from the discharge port 504 into the document send-out path 200 through the document send-in port 217 of the automatic document feeder 10. The document sent into the document send-out path 200 is discharged onto the stationary plate 104 of the document stand means 102 of the automatic document feeder 10 by the action of the transport roller pair 210 and the document discharge roller pair 214. The conveying speed of the transport roller pair 210 and the document discharge roller pair 214 is higher than the conveying speed of the document transport roller pairs 508, 510, 512. However, the document transport roller pairs 508, 510, 512 are provided with the one-way clutches 514, 515, 516, respectively. Thus, the document transport roller pairs 508, 510, 512 are rotated by the conveyed document so that their conveying speed will agree with the conveying speed of the transport roller pair 210 and the document discharge roller pair 214, whereby the difference in speed between these two types of roller pairs is accommodated. When the document is thus discharged onto the stationary plate 104 of the document stand means 102, the pair of width regulating cursors 110, 110 have been aligned in response to the document size as done at step P1. Hence, the discharged document will not pass over the width regulating cursors.

After the document printed by the printer 4 is discharged onto the stationary plate 104 of the document stand means 102 by the action of the document transport roller pairs 508, 510, 512 of the document supply device 5 as well as the transport roller pair 210 and the document discharge roller pair 214 of the automatic document feeder 10, the control means 600 goes to step P7 to check whether the conveyed document is the last document or not. Determination means to decide whether it is the last document will be described in detail later. If, at step P7, it is found not to be the last document, the control means 600 moves to the step P2, and executes the steps P2 to P7 repeatedly. When the document has been regarded as the last document at step P7, the control means 600 goes to step P8 to move the document stack, discharged onto the stationary plate 104 of the document stand means 102, to the document setting portion. That is, the electric motor 242 (M6) of the document moving mechanism 220 is driven for a predetermined amount of normal rotation in correspondence with the size of the document, whereupon the protruding member 232 advances the document stack downstream. At this moment, the document setting stopper 145 is put to the stop position, and the press member 142 and the discharged document front end position regulating member 147 are located at the ascent position and the retreat position, respectively. Thus, the document stack advanced downstream by the document moving mechanism 220 has its front end in contact with the document setting stopper 145, and is thus set at a predetermined position. After the document stack discharged onto the stationary plate 104 of the document stand means 102 is set at the predetermined position in this manner, the electric motor 242 (M6) is driven for a predetermined amount of reverse rotation, whereby the protruding member 232 is brought to the receding position. When the moving control of the document stack by the document moving mechanism 220 is performed at step P8, the control means 600 goes to step P9 to check whether a document discharge instruction has been issued by the host computer 2. When the document discharge instruction has been issued, the control means 600 goes to step P10 to energize the solenoid 219 (SOL5) to bring the switching control plate 218 to the second position. Then, the control means 600 goes to step P11. If there is no document discharge instruction from the host computer 2 at step P9, the control means 600 proceeds to step P11 to carry out a copy action.

The copy action at step P11 is the same as a copy action which is performed using the automatic document feeder 10 in the copying machine put to actual use.

That is, the document setting stopper 145 is brought to the retreat position, the press member 142 presses the document laid on the stationary plate 104, and the discharged document front end position regulating member 147 is put to the regulating position. Further, the electric motor 190 (M4) is driven to actuate the feed roller 152 and the document separating means 150. The bottom-most document in the document stack placed on the document stand means 102 is thereby sent into the document send-in path 170. When a predetermined period of time has elapsed since the document detector 192 (SW4) detected the front end of the document so sent into the document send-in path 170, the electric motor 190 (M4) is stopped. As a result, the front end of the sent-in document is brought into contact with the nip site of the send-in roller pair 178 put in the nonoperating state. This causes a front part of the document to be curved, thereby correcting a slant of the document. Then, the electric motor 168 (M3) is driven for normal rotation, and the electric motor 190 (M4) is driven to further advance the document sent in as far as the send-in roller pair 178. Consequently, the document is delivered into the document transport path 169, and brought to a predetermined position on the transparent platen 830 of the copying machine body 8. When the document is thus positioned at the predetermined position on the transparent platen 830, the respective devices of the copying machine body 8 are actuated to perform a copy action for making the number of copies designated by the host computer 2. Transfer sheets that have been dispatched from the transfer sheet supply means 840 and have images transferred onto them are discharged sequentially onto predetermined stages of the sorter 880.

Upon completion of a copy action for the first document in the above-described manner, the electric motor 168 (M3) is driven for normal rotation, whereby the conveyor belt mechanism 160 is rotationally driven counterclockwise in FIG. 4. Furthermore, the electric motor 216 (M5) is driven to rotationally drive the send-out roller 202 and the transport roller pair 210. Thus, the document on the transparent platen 830 is conveyed from the document transport path 169 toward the document send-out path 200. When, at this moment, the switching control plate 218 is located at the second position, the document conveyed by the conveyor belt mechanism 160 is conveyed to the document receiving tray 532 through the bypass path 215 and the document return passageway 530 provided in the document supply device 5. When the switching control plate 218 is located at the first position, on the other hand, the document conveyed by the conveyor belt mechanism 160 is sent to the document send-out path 200, and discharged onto the stationary plate 104 of the document stand means 102 by the action of the send-out roller 202, transport roller pair 210 and document discharge roller pair 214. A copy action is completed by performing the above-described document send-in, copy and discharge actions for all the documents placed on the stationary plate 104 of the document stand means 102. If a clear key of the operating portion disposed on the top of the copying machine 6 is depressed during the copy action, the control means 600 ceases the copy action, and clears the copy mode.

Next, an explanation will be offered for determination means for judging whether the document at step P7 in the print/copy mode is the final document or not. First, cases in which the control data transferred from the host computer 2 to the control means 600 of the copying machine 6 designates the number of documents will be explained with reference to a flow chart shown in FIG. 11. The control means 600 of the copying machine 6 sets in the counter (C) the number of documents (ND) of the control data transferred from the host computer 2 (step Q1). After the number of documents (ND) is set at step Q1, the control means 600 starts counting with the counter (C), and goes to step Q2 to check whether the document detector 520 (SW2) disposed on the document transport path 506 of the document supply device 5 is ON or not, namely, whether the front end of the document printed by the printer 4 has reached the document detector 520 (SW2). If the document detector 520 (SW2) is not ON, the control means 600 enters the wait state. When it is ON, the control means 600 proceeds to step Q3, adding +1 to the counted value (NC). Then, the control means 600 proceeds to step Q4, checking whether the counted value (NC) has equaled the set number of documents (ND). If the counted value (NC) is not equal to the number of documents (ND), the control means 600 moves to the step Q2, repeating the steps Q2 to Q4. When the counted value (NC) is equal to the number of documents (ND) at step Q4, the control means 600 determines that the document is the final document (step Q5).

Figure 12:
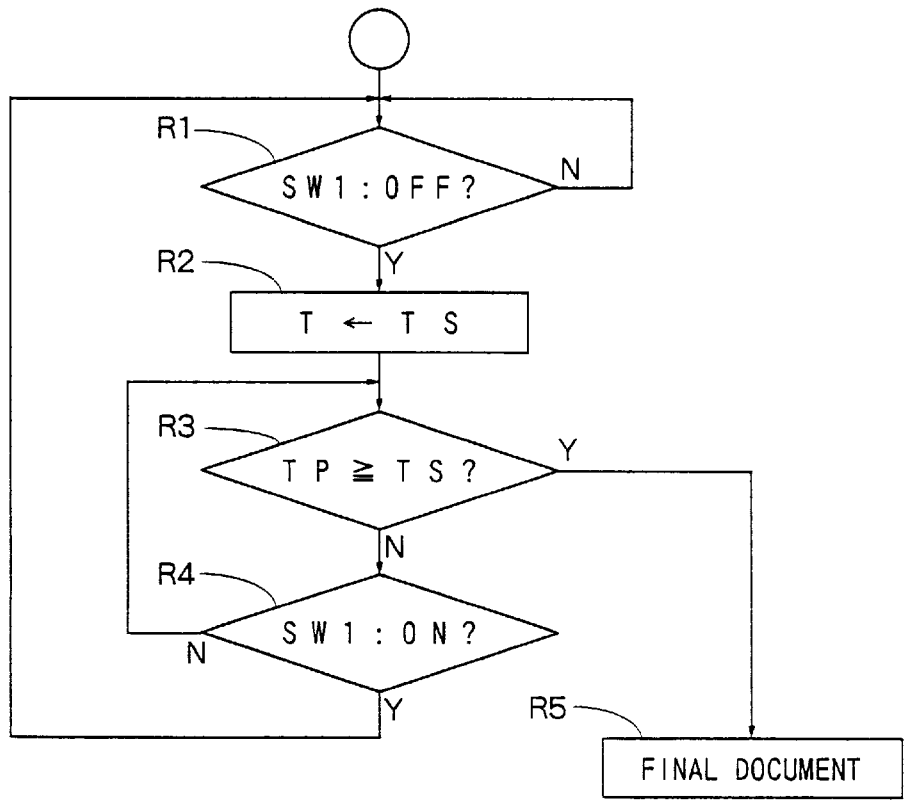
FIG. 12 is a flow chart showing another embodiment of the final document determination procedure of the control means of the copying machine shown in FIG. 7.

Next, determination means on the final document in cases where the number of documents has not been designated in data transferred from the host computer 2 to the control means 600 of the copying machine 6 will be explained with reference to a flow chart shown in FIG. 12. The control means 600 of the copying machine 6 checks at step R1 whether the document detector 518 (SW1) disposed on the document transport path 506 of the document supply device 5 is OFF or not, namely, whether the rear end of the document printed by the printer 4 has passed the document detector 518 (SW1). If the document detector 518 (SW1) is not OFF, the control means 600 enters the wait state. When the document detector 518 (SW1) is OFF, the control means 600 goes to step R2, setting the timer (T) at a predetermined time (TS). The set time (TS) is set in consideration of the print speed of the printer 4, and has been set, for example, at about twice the print timing relative to the next page. Then, the control means 600 proceeds to step R3 to check whether the elapsed time (TP) since the timer (T) was set at the predetermined time (TS) has reached the set time (TS) or not. If the elapsed time (TP) has not reached the set time (TS), the control means 600 proceeds to step R4 to check whether the document detector 518 (SW1) is ON or not. If the document detector 518 (SW1) is not ON at step R4, this means that the next document printed by the printer 4 has not reached the document detector 518 (SW1). In this case, the control means 600 returns to the step R3, executing the steps R3 and R4 again. When the document detector 518 (SW1) is ON at step R4, it is determined that the next document printed by the printer 4 has reached the document detector 518 (SW1). The control means 600 moves to the step R1, executing the steps R1 to R4 repeatedly. When, at step R3, the elapsed time (TP) since the timer (T) was set at the predetermined time (TS) has reached the set time (TS), the control means 600 determines that the document is the final document (step R5).

Figure 14:
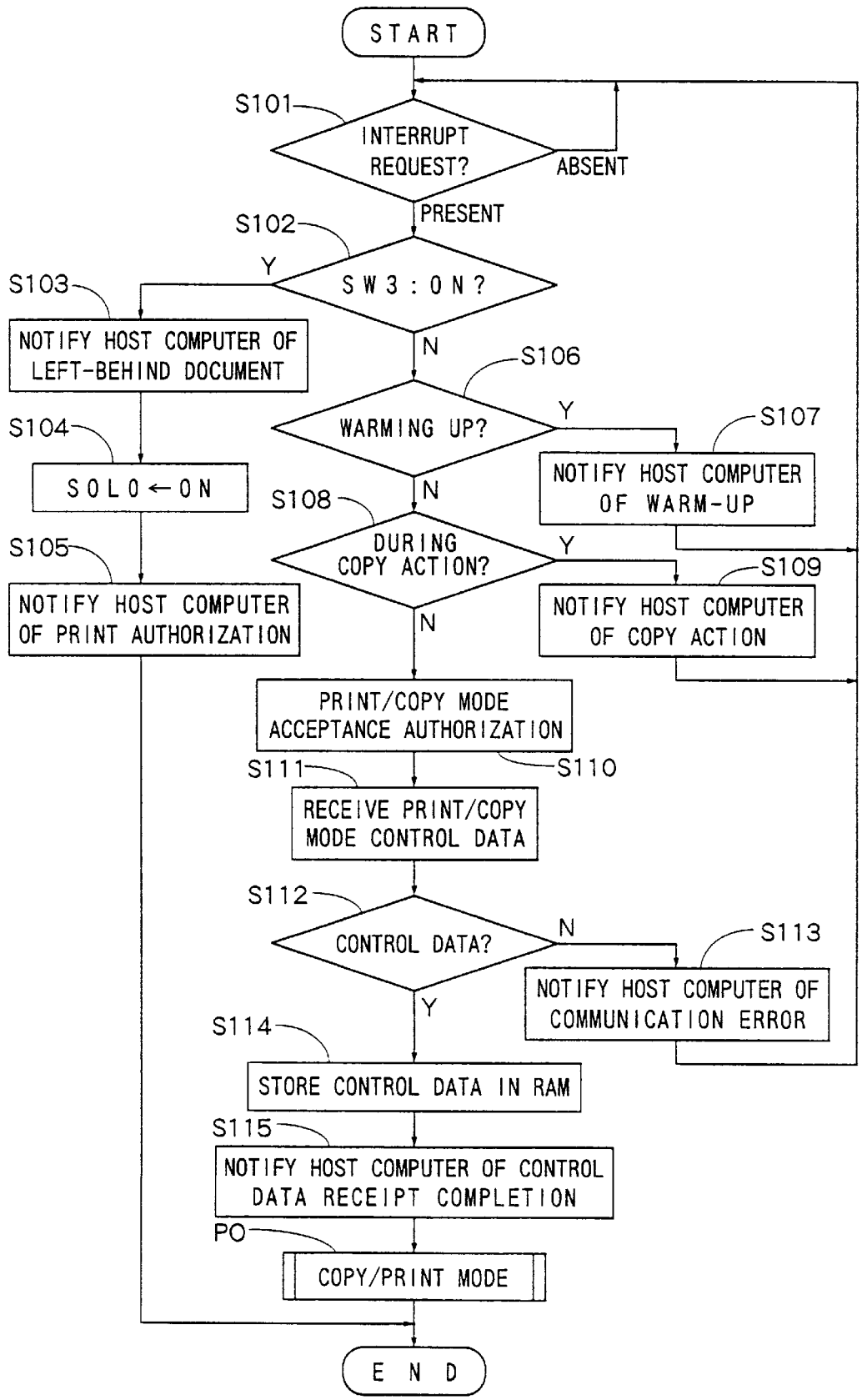
FIG. 14 is a flow chart showing another embodiment of the print/copy mode of the operating procedure of the control means of the copying machine shown in FIG. 7.
Figure 15:
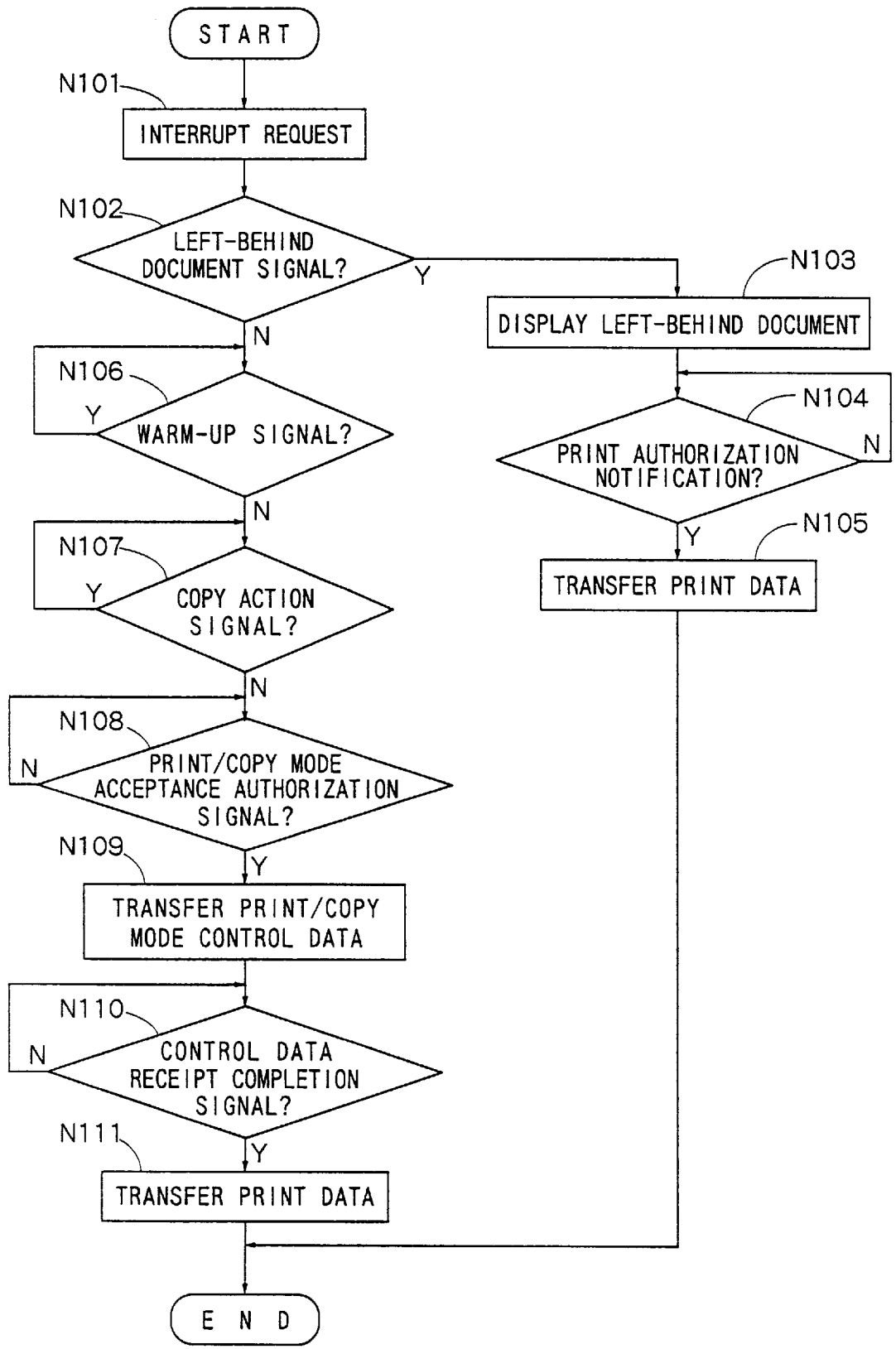
FIG. 15 is a flow chart showing another embodiment of the operating procedure of the host computer shown in FIG. 7.

FIGS. 14 and 15 will explain embodiments in which even if a left-behind document is present on the document stand means 102 of the automatic document feeder 10, a print is made by the printer 4, and the printed document is directly discharged without being conveyed onto the document stand means 102 of the automatic document feeder 10. First, the actions of the control means 600 of the copying machine 6 will be described based on a flow chart shown in FIG. 14.

The control means 600 checks a print/copy interrupt request from the host computer 2 (step S101). When the interrupt request has existed, it goes to step S102 to check whether the document detector 149 (SW3) for detecting the placement of a document on the stationary plate 104 of the document stand means 102 is ON or not, namely, whether or not there is a left-behind document on the document stand means 102 that the operator forgot to withdraw upon completion of a preceding copy action. If the document detector 149 (SW3) is ON, that is, a left-behind document is present on the document stand means 102, the control means 600 goes to step S103 to notify the host computer 2 of its presence. Then, the control means 600 goes to step S104, energizing the solenoid 542 (SOLO) constituting the document discharge means to bring the switching control plate 541 to the second position. Then, the control means 600 goes to step S105, notifying the host computer 2 of a print authorization.

When the document detector 149 (SW3) is not ON at the step S102, a decision is made that no left-behind document is present on the document stand means 102. Thus, the control means 600 goes to step S106 to perform steps S106 to S115 and step PO. Since these steps S106 to S115 and step PO are the same as the steps S4 to S13 and step PO in the embodiment shown in FIG. 9, their explanations will be omitted herein.

Next, the actions of the host computer 2 will be described based on a flow chart shown in FIG. 15.

When the operator executes "print" from the keyboard 21 of the host computer 2 in the aforementioned manner, the host computer 2 makes a print/copy request to the copying machine (step N101). Then, the host computer 2 goes to step N102, checking for a left-behind document signal from the control means 600 of the copying machine 6. If a left-behind document signal exists, the host computer 2 goes to step N103, showing its existence on the display. Then, the host computer 2 goes to step N104, checking for a print authorization notification from the control means 600. In the absence of the print authorization notification, the host computer 2 enters the wait state. In the presence of the print authorization notification, the host computer 2 goes to step N105, transferring print data to the control means 400 of the printer 4 via the parallel data transfer type interface 450. Print data is thus transferred to the control means 400 of the printer 4, and the document printed by the printer 4 is sent into the document transport path 506 of the document supply device 5. At this moment, the switching control plate 541 has been put to the aforementioned second position. Thus, the document delivered to the document transport path 506 is directly discharged onto the document receiving tray 543 through the document discharge path 540. If the host computer 2 and the copying machine 6 are installed at distant places, therefore, the operator goes to the place of installation of the copying machine 6 and the printer 4. Then, the operator can remove the left-behind document on the document stand means 102, and have the copying machine 6 make a predetermined number of copies on the basis of the document directly discharged onto the document receiving tray 543.

When there is no left-behind document signal from the control means 600 at the step N102, a decision is made that no left-behind document is present on the document stand means 102. Thus, the host computer 2 goes to step N106 to perform steps N106 to N111. Since these steps N106 to N111 are the same as the steps N4 to N9 in the embodiment shown in FIG. 13, their explanations will be omitted herein.

Since the image forming machine shown in FIGS. 1 to 15 is constructed as above, it exhibits the following actions and effects:

In the image forming machine, if there is a left-behind document on the document stand means of the automatic document feeder of the copying machine when a print/copy request is made by the host computer, the control means notifies the host computer of its presence, whereupon the host computer shows its presence on the display. This display alerts the operator to the presence of the left-behind document on the document stand means. Thus, the operator can remove the left-behind document on the document stand means, and avoid the mistake of making a copy of the left-behind document by executing a print/copy action again.

In the image forming machine of the invention, moreover, if there is a left-behind document on the document stand means of the automatic document feeder of the copying machine when a print/copy request is made by the host computer, the control means notifies the host computer of its presence. The control means also actuates the document discharge means for directly discharging the document printed by the printer, and directly discharges the document printed by the printer on the basis of a print command from the host computer. Thus, the mistake of copying the left-behind document on the document stand means can be avoided. If the host computer and the copying machine are installed at distant places, the operator may first print the document, and then go to the place where the copying machine and the printer are installed. Then, the operator can remove the left-behind document on the document stand means, and have the copying machine make a predetermined number of copies on the basis of the document directly discharged.

Figure 16:
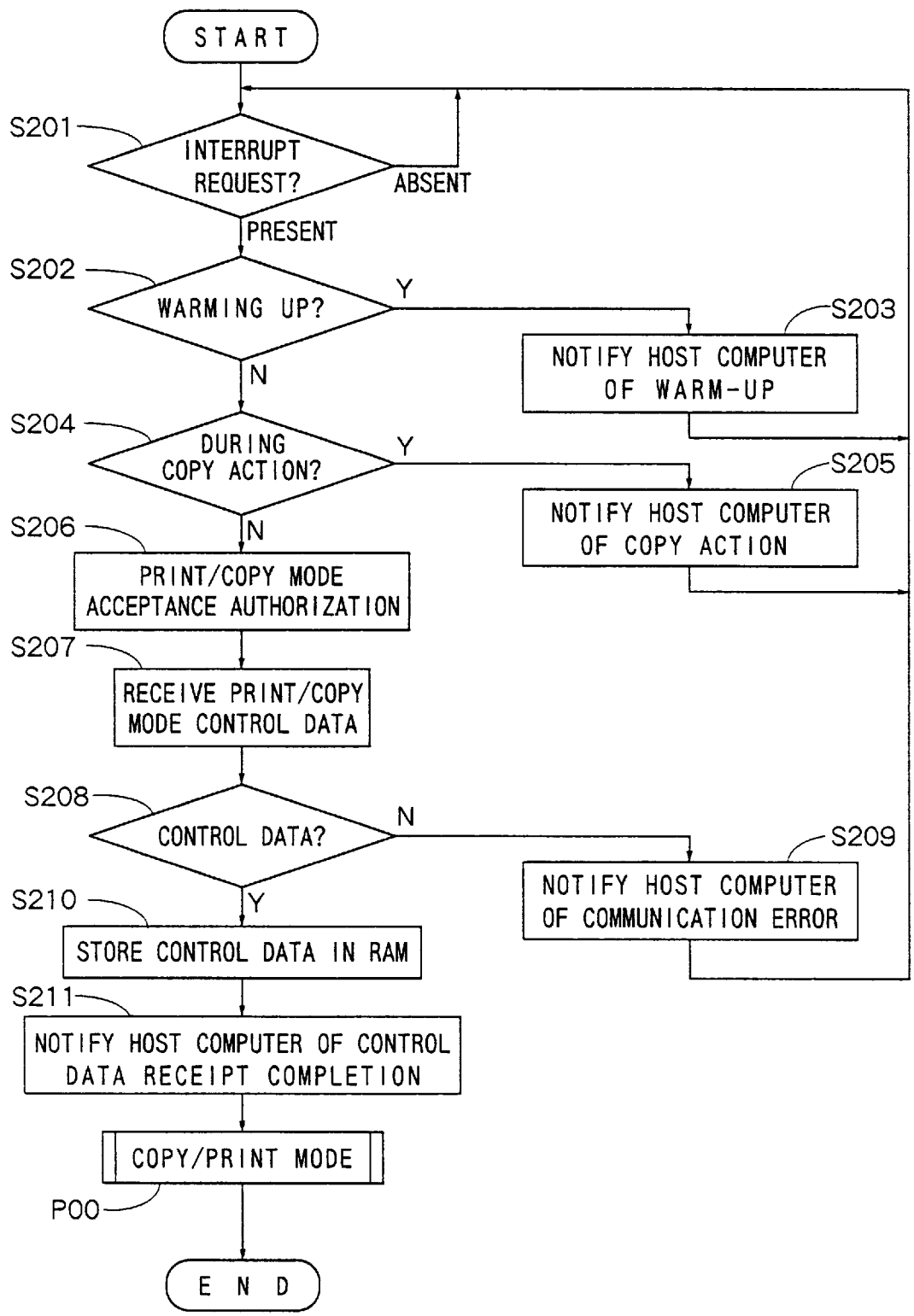
FIG. 16 is a flow chart showing another embodiment of a main routine for the operating procedure of the control means of the copying machine shown in FIG. 7.

Another embodiment of the actions in the illustrated image forming machine will be described with reference to flow charts shown in FIGS. 16 and 17.

The description will be made of cases in which edit work is completed in the host computer 2, the edited image is printed by the printer 4, and the print as a document is copied as a predetermined number of copies by the copying machine 6. The operator requests print/copy from the keyboard of the host computer 2. This print/copy request results in an interrupt request made to the control means 600 of the copying machine 6 via RS-232-C, the serial data transfer type interface 650. The actions of the control means 600 of the copying machine 6 that has received the interrupt request for print/copy from the host computer 2 will be described on the basis of FIG. 16.

The control means 600 checks the print/copy interrupt request from the host computer 2 (step S201). When the interrupt request has existed, it goes to step S202 to check whether the copying machine 6 is warming up or not. A judgment of the warm-up is made, for example, by determination of whether the fixing roller pair 876 has reached a predetermined temperature. When the copying machine 6 is in the warm-up, the control means 600 proceeds to step S203 to notify the host computer 2 of the warm-up. If the copying machine 6 is not under warm-up at step S202, the control means 600 goes to step S204 to check whether the copying machine 6 is in a copy action. When the copying machine 6 is doing a copy action, the control means 600 goes to step S205 to notify the host computer 2 of the copy action. If the copying machine 6 is doing no copy action at step S205, the control means 600 proceeds to step S206, sending a print/copy mode acceptance authorization signal to the host computer 2. Then, the control means 600 goes to step S207, receiving print/copy mode control data from the host computer 2. This print/copy mode control data covers the copy conditions such as the number of documents, the size of the document, the number of copies, variable magnification, and the amount of exposure. After receiving the control data in the print/copy mode from the host computer 2 at step S207, the control means 600 goes to step S208 to make sure that the received data is control data. If the received data is print data or the like, rather than control data, the control means 600 proceeds to step S209 to notify the host computer 2 of a communication error. When the data received from the host computer 2 at step S208 is control data, the control means 600 goes to step S210, storing the received control data into the built-in random access memory (RAM). Then, the control means 600 proceeds to step S211, notifying the host computer 2 that the receipt of control data has been completed. The control means 600 further proceeds to step P00 to execute actions in the copy/print mode.

The actions in the copy/print mode will be described with reference to a flow chart shown in FIG. 17. After receiving a signal about the completion of receipt of control data from the control means 600 at the step S211, the host computer 2 transmits print data to the control means 400 of the printer 4 via the parallel data transmission interface 450. As a result, the printer 4 starts a print action based on the print data from the host computer 2.

Figure 10:
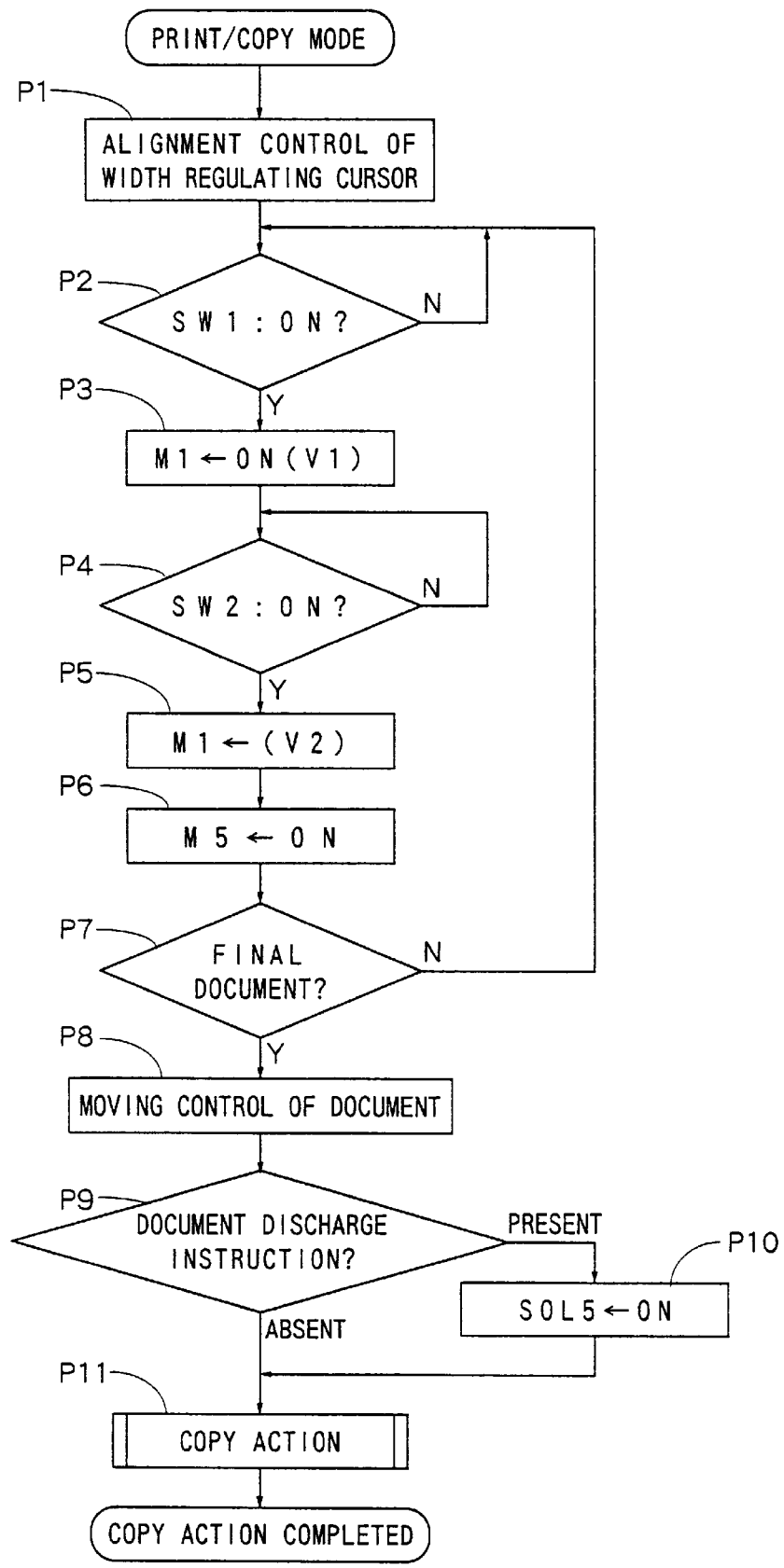
FIG. 10 is a flow chart showing an embodiment of the print/copy mode of the operating procedure of the control means of the copying machine shown in FIG. 7.
Figure 11:
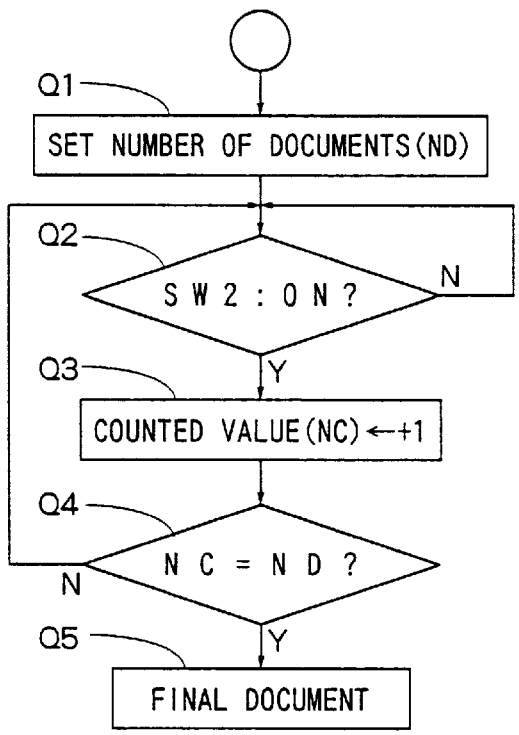
FIG. 11 is a flow chart showing an embodiment of the final document determination procedure of the control means of the copying machine shown in FIG. 7.
Figure 17:
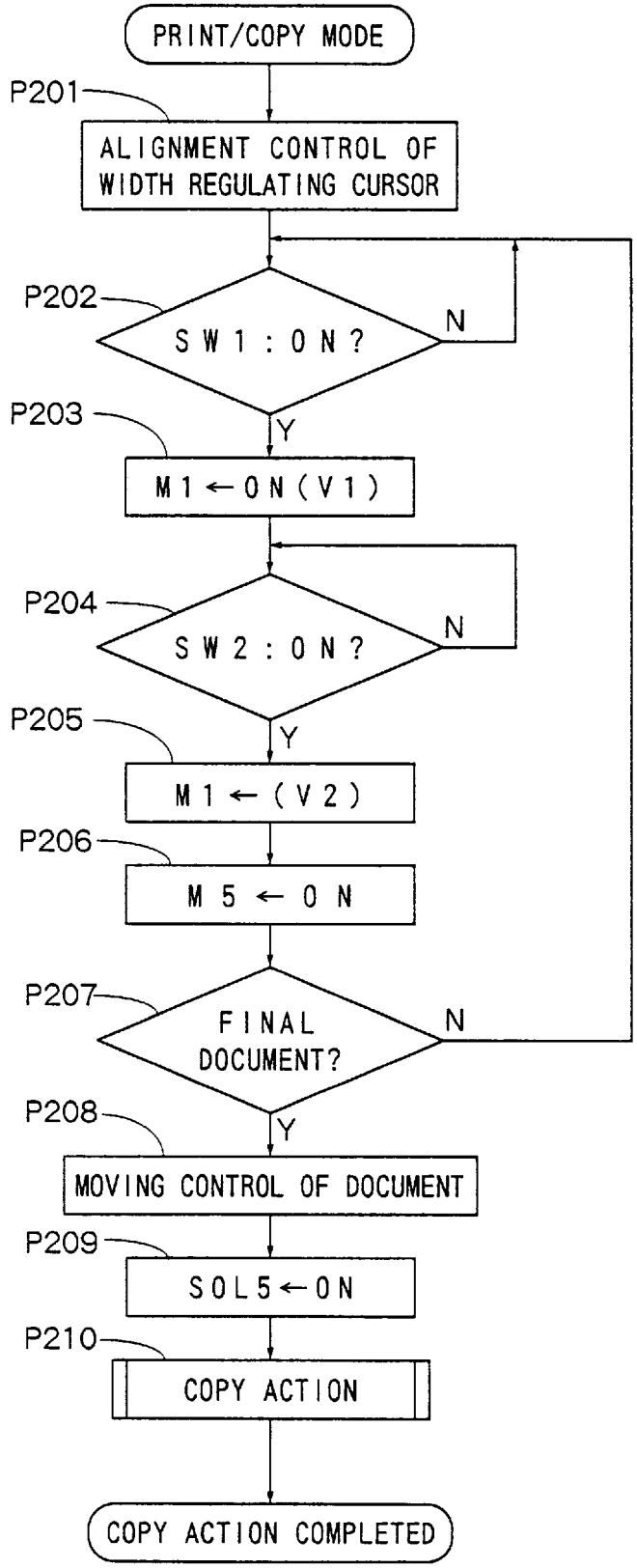
FIG. 17 is a flow chart showing still another embodiment of the print/copy mode of the operating procedure of the control means of the copying machine shown in FIG. 7.

Since steps P201 to P208 in the embodiment shown in FIG. 17 are the same as the steps P1 to P8 in the embodiment of FIG. 10, their explanations will be omitted herein. After the steps P201 to P208 have been executed, and the moving control of the document stack by the document moving mechanism is performed at step P208, the control means 600 goes to step P209, energizing the solenoid 219 (SOL5) to bring the switching control plate 218 to the second position. Then, the control means 600 goes to step 210 to execute a copy action.

The copy action at step P210 is the same as that at the step P11 in FIG. 10. In this embodiment, however, the document having finished the copy action is discharged, without fail, to the outside of the automatic document feeder. That is, after the copy action for the first document is completed, the electric motor 168 (M3) is driven for normal rotation to rotationally drive the conveyor belt mechanism 160 counterclockwise in FIG. 4. Also, the electric motor 216 (M5) is driven to rotationally drive the send-out roller 202 and the transport roller pair 210. Thus, the document on the transparent platen 830 is conveyed from the document transport path 169 toward the document send-out path 200. On this occasion, in the print/copy mode the switching control plate 218 is brought to the second position at the step P209. Thus, the document conveyed by the conveyor belt mechanism 160 is sent to the document receiving tray 532 through the bypass path 215 and the document return passageway 530 provided in the document supply device 5. When the copy action is completed for all of the documents placed on the stationary plate 104 of the document stand means 102, the documents are all discharged onto the document receiving tray 532 outside of the automatic document feeder 10. Hence, the document is prevented from being mistakenly left behind on the document stand means 102.

Figure 18:
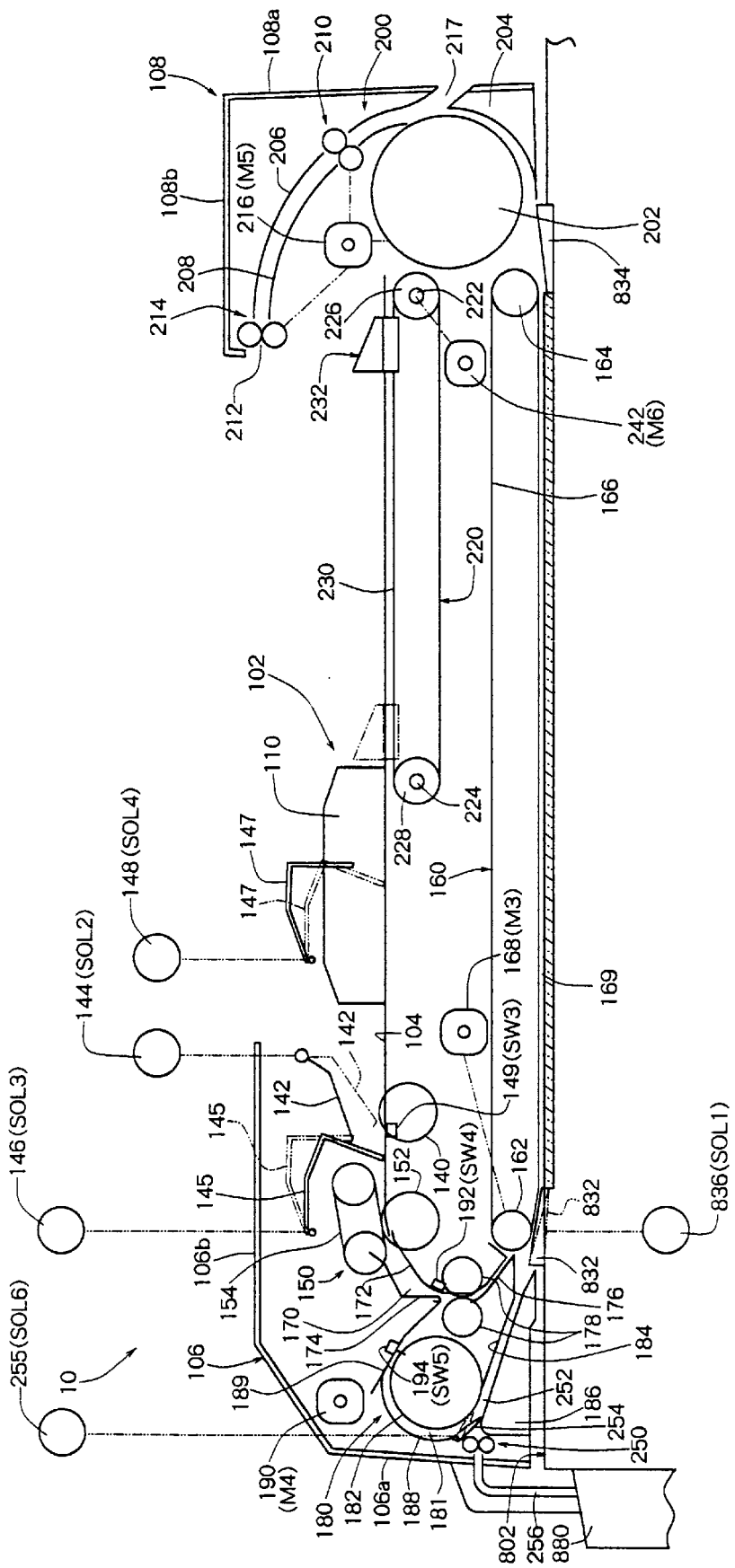
FIG. 18 is a sectional view showing another embodiment of the automatic document feeder provided in the copying machine which constitutes the image forming machine shown in FIG. 1.

Another embodiment of the image forming machine constructed in accordance with the present invention will be described with reference to FIGS. 18 and 19. FIG. 18 shows another embodiment of the automatic document feeder 10 provided in the copying machine 6. The same parts as in the embodiment shown in FIG. 4 are assigned the same numerals, and their explanations are omitted.

In the automatic document feeder 10 shown in FIG. 18, a document discharge roller pair 250 is disposed on the left, in the drawing, of the document inversion path 181 constituting the document inversion mechanism 180. This document discharge roller pair 250 is transmissively connected to the electric motor 190 (M4) via a power transmission mechanism (not shown), and is rotationally driven thereby. Upstream from the document discharge roller pair 250, a bypass path 252 is provided. At a bifurcation between the bypass path 252 and the document inversion path 181, a switching control plate 254 is disposed. The switching control plate 254 is adapted to be actuated by a solenoid 255 (SOL6). When the solenoid 255 (SOL6) is deenergized, the switching control plate 254 is located at a first position indicated by a solid line in FIG. 13. When the solenoid 255 (SOL6) is energized, the switching control plate 254 is located at a second position indicated by a two-dot chain line. Thus, when the switching control plate 254 is brought to the first position, the document conveyed leftward in the drawing by the conveyor belt mechanism 160 is sent to the document inversion path 180. When the switching control plate 254 is brought to the second position, on the other hand, the document conveyed leftward in the drawing by the conveyor belt mechanism 160 is conveyed to the bypass path 252. The document conveyed to the bypass path 252 is discharged by the document discharge roller pair 250 to the outside of the automatic document feeder. The document discharged by the document discharge roller pair 250 is conveyed onto a predetermined step of the sorter 880 through a communication passageway 256. In the illustrated embodiment, therefore, the conveyor belt mechanism 160, the switching control plate 254, the solenoid 255 (SOL6), the bypass path 252, and the communication passageway 256 constitute document discharge means for discharging the document exposed on the transparent platen 830 to the outside of the automatic document feeder. The solenoid 255 (SOL6) is actuated controllably by the control means 600, and the switching control plate 218 to be actuated by the solenoid 255 (SOL6) is located at the first position except during document discharge, and located at the second position during document discharge. In the embodiment shown in FIG. 18, none of the switching control plate 218, solenoid 219 (SOL5) and bypass path 215 disposed on the entrance side of the document send-out path 200 in the embodiment of FIG. 4 are provided.

The actions in the print/copy mode of the image forming machine having the automatic document feeder 10 shown in FIG. 18 will be described with reference to a flow chart in FIG. 19.

Figure 19:
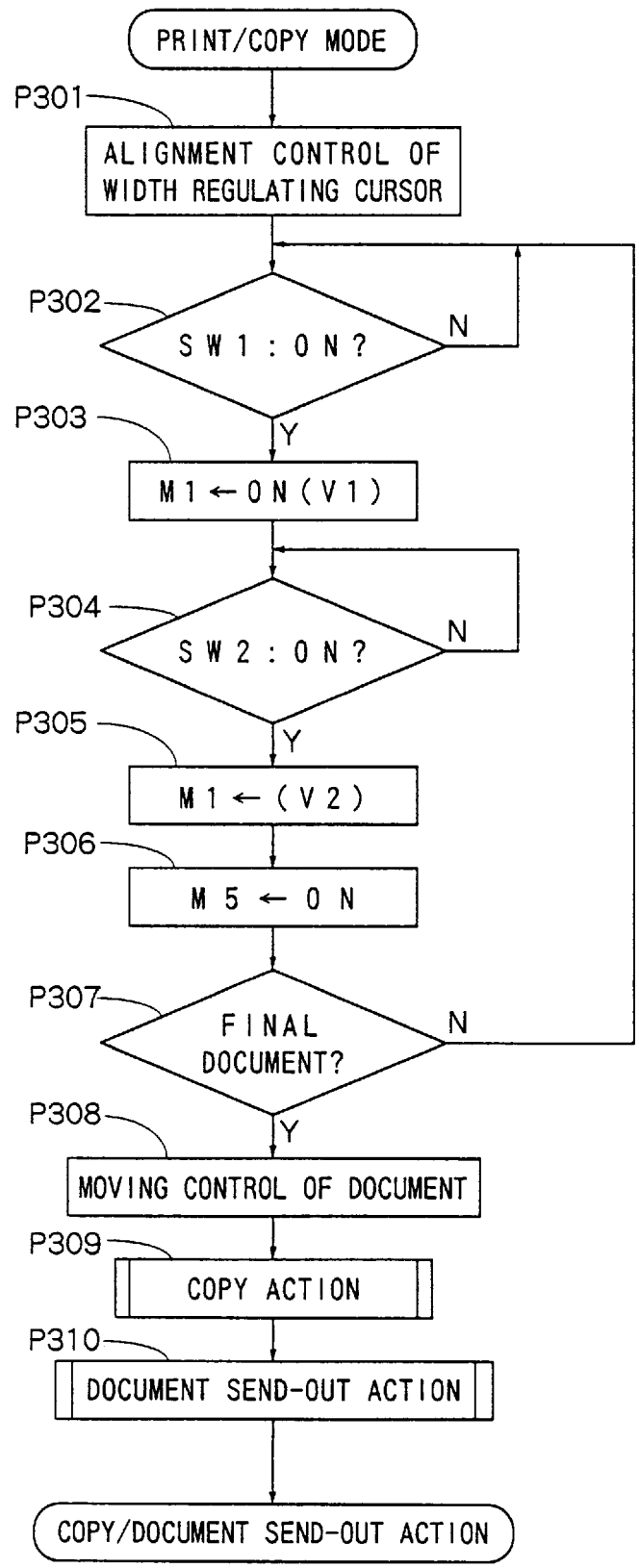
FIG. 19 is a flow chart showing a further embodiment of the print/copy mode of the operating procedure of the control means of the copying machine shown in FIG. 7.

Steps P301 to P308 in the embodiment shown in FIG. 19 are the same as the steps P201 to P208 in the embodiment of FIG. 17, and so their explanations will be omitted. After steps P301 to P308 are executed, a copy action is executed at step P309. The copy action at step P309 is practically the same as the copy action at step P210 in FIG. 17, the difference being in the manner of conveying the document exposed at the predetermined position on the transparent platen 830 of the copying machine body 8. That is, upon completion of exposure of the first document in the above-described manner, the electric motor 168 (M3) is driven for normal rotation, whereby the conveyor belt mechanism 160 is rotationally driven counterclockwise in FIG. 18. Furthermore, the electric motor 216 (M5) is driven to rotationally drive the send-out roller 202 and the transport roller pair 210. Thus, the document on the transparent platen 830 is conveyed from the document transport path 169 toward the document send-out path 200. The document conveyed by the conveyor belt mechanism 160 is sent to the document send-out path 200, and discharged onto the document stand means 102 by the action of the send-out roller 202, transport roller pair 210 and document discharge roller pair 214. A copy action is completed by performing the above-described copying for all the documents placed on the stationary plate 104 of the document stand means 102. When the copy action is complete, the documents have all been returned onto the document stand means 102.

Upon completion of the above copy action, the control means 600 of the copying machine 6 goes to step P310, executing a discharge action for the document returned onto the document stand means 102. The document discharge action starts with movingly controlling the document stack returned onto the document stand means 102 to the document setting portion. This document moving control is the same as that in the step 308 (step P208 in FIG. 17). As a result of this document moving control, the document returned onto the document stand means 102 is set at a predetermined position. The document setting stopper 145 is brought to the retreat position, the press member 142 presses the document laid on the document stand means 102, and the electric motor 190 (M4) is driven. Thereby, the feed roller 152 and the document separating means 150 are actuated, whereby the bottom-most document in the document stack placed on the document stand means 102 is sent into the document send-in path 170. The document thus sent into the document send-in path 170 is delivered into the document transport path 169 by the send-in roller pair 178. Further, the electric motor 168 (M3) is driven for normal rotation, so that the document is conveyed onto the transparent platen 830 of the copying machine body 8 by the conveyor belt mechanism 160. Then, the solenoid 836 (SOL1) is energized to position the document restraining member 832 to the descent position, and the electric motor 168 (M3) is driven for reverse rotation. Thus, the document conveyed onto the transparent platen 830 is fed leftward in FIG. 18. At this time, the solenoid 255 (SOL6) is energized to locate the switching control plate 254 at the second position indicated by the two-dot chain line. Thus, the document conveyed leftward in FIG. 18 from the transparent platen 830 passes through the bypass path 252, and is discharged to the outside of the automatic document feeder by the action of the document discharge roller pair 250. Then, the document is carried to a predetermined step of the sorter 880 through the communication passageway 256. This document discharge action is performed for all the documents returned onto the document stand means 102, whereby all documents are placed on the predetermined steps of the sorter 880, to complete the document discharge action. The carriage of the document to the sorter 880 can be performed in the group mode and the sort mode. In the group mode, the respective pages of the transfer sheets having the transferred images are separately housed in the respective bins of the sorter, so that the documents are also carried to the respective bins corresponding to the respective pages. In the sort mode, the transfer sheets having the transferred images are housed in the respective bins of the sorter, one set of the consecutive pages in each bin, so that the set of documents is conveyed to a predetermined bin or a dedicated tray. In the illustrated embodiment, as described above, the document returned onto the document stand means 102 after completion of exposure is conveyed to the sorter 880 where the transfer sheets copied by the copying machine body 8 are discharged. Since the document can be taken out together with the copies at a nearby place, its handling is convenient, and the leaving-behind of the document on the document stand means can be prevented. The foregoing embodiment exemplifies the execution of a document discharge action after returning all the exposed documents onto the document stand means 102. However, each time the document conveyed onto the transparent platen 830 finishes exposure, its discharge action may be performed.

During the document discharge action, the document inversion mechanism 180 may be used, whereby the order of stacking of the documents discharged can be conformed to the order of stacking of the transfer sheets discharged. That is, the document on the document stand means 102 can be fed onto the transparent platen 830 in the above manner, and then conveyed to the document inversion path 180, whereby the face and back of the document are inverted and conveyed again onto the transparent platen 830. By this inverting action, the face of the document faces upward. During this document inversion, the solenoid 255 (SOL6) is deenergized to position the switching control plate 254 at the first position indicated by the solid line. After the document is inverted and conveyed onto the transparent platen 830 again, the electric motor 168 (M3) is driven for reverse rotation. Simultaneously, the solenoid 255 (SOL6) is energized to locate the switching control plate 254 at the second position indicated by the two-dot chain line. Thus, the document on the transparent platen 830 passes through the bypass path 252, and is discharged to the outside of the automatic document feeder by the action of the document discharge roller pair 250. Then, the document is carried to a predetermined step of the sorter 880 through the communication passageway 256.

The present invention has been described based on the foregoing illustrated embodiments. However, the invention is in no way limited to them, and various changes and modifications are possible within the scope of the technical ideas of the invention. For example, the document discharge means may be means for discharging the documents, as a single unit, which have been returned onto the document stand means 102 after completion of an exposure action; or means of discharging the documents on the document stand means 102 by a robot arm.

The image forming machine illustrated in FIGS. 16 to 19 is constructed in the above-described manner, thus exhibiting the following actions and effects:

The image forming machine of the present invention has document discharge means for discharging the document, which has been conveyed from the document stand means of the automatic document feeder to an exposure position of the copying machine and exposed there, to the outside of the automatic document feeder, wherein upon completion of exposure of the document conveyed to the exposure position, the control means actuates the document discharge means to discharge the document to the outside of the automatic document feeder. Thus, the document can be prevented from being left behind on the document stand means.

What we claim is:

1. An image forming machine comprising a host computer; a printer for printing the output of said host computer; a copying machine for making a predetermined number of copies of a document which is a printed sheet printed by said printer, said copying machine being equipped with an automatic document feeder; and a document supply device for conveying the document printed by said printer to document stand means of said automatic document feeder, the document being conveyed from said document stand means to an exposure position of the copying machine;

said image forming machine including
a document detector for detecting the presence or absence of the document on said document stand means of said automatic document feeder, and
control means which controls a copy action on the basis of a copy command from said host computer, and which, when the document is present on said document stand means on the basis of a detection signal from said document detector, transmits a left-behind document signal to said host computer; wherein
if said control means receives from said document detector a detection signal indicating the presence of a document on said document stand means when a print/copy request is made by said host computer, said control means transmits a left-behind document signal to said host computer, and
when said left-behind document signal from said control means is entered, said host computer shows the presence of a left-behind document on a display of said host computer.

2. An image forming machine comprising a host computer; a printer for printing the output of said host computer; a copying machine for making a predetermined number of copies of a document which is a printed sheet printed by said printer, said copying machine being equipped with an automatic document feeder; and a document supply device for conveying the document printed by said printer to document stand means of said automatic document feeder;

said image forming machine including
document discharge means for directly discharging the document printed by said printer,
a document detector for detecting the presence or absence of the document on said document stand means of said automatic document feeder, and control means which controls a copy action on the basis of a copy command from said host computer, and which, when the document is present on said document stand means on the basis of a detection signal from said document detector, transmits a left-behind document signal to said host computer; wherein if said control means receives from said document detector a detection signal indicating the presence of a document on said document stand means when a print/copy request is made by said host computer, said control means actuates said document discharge means to directly discharge the document printed by said printer.

3. The image forming machine of claim 2, wherein if said control means receives from said document detector a detection signal indicating the presence of a document on said document stand means when a print/copy request is made by said host computer, said control means transmits a left-behind document signal to said host computer, and when said left-behind document signal from said control means is entered, said host computer shows the presence of a left-behind document on a display of said host computer.

4. An image forming machine comprising a host computer; a printer for printing the output of said host computer; a copying machine for making a predetermined number of copies of a document which is a printed sheet printed by said printer, said copying machine being equipped with an automatic document feeder; and a document supply device for conveying the document printed by said printer to document stand means of said automatic document feeder;

said image forming machine including document discharge means for discharging the document, which has been conveyed from said document stand means of said automatic document feeder to an exposure position of said copying machine and exposed there, to the outside of said automatic document feeder, and control means for controlling said document discharge means so as to be actuated; wherein upon completion of exposure of the document conveyed to said exposure position of said copying machine, said control means actuates said document discharge means to discharge the document to the outside of said automatic document feeder, and said document supply device is provided with a document return passageway and a document receiving tray disposed in association with the exit of said document return passageway, and said document discharge means conveys the document, which has been fed to said exposure position of said copying machine and exposed there, to said document receiving tray through said document return passageway, whereby said document receiving tray receives only documents printed by said printer.

5. An image forming machine comprising a host computer; a printer for printing the output of said host computer; a copying machine for making a predetermined number of copies of a document which is a printed sheet Printed by said printer, said copying machine being equipped with an automatic document feeder; and a document supply device for conveying the document printed by said printer to document stand means of said automatic document feeder;

said image forming machine including document discharge means for discharging the document, which has been conveyed from said document stand means of said automatic document feeder to an exposure position of said copying machine and exposed there, to the outside of said automatic document feeder, and control means for controlling said document discharge means so as to be actuated; wherein upon completion of exposure of the document conveyed to said exposure position of said copying machine, said control means actuates said document discharge means to discharge the document to the outside of said automatic document feeder, said copying machine includes a sorter for sorting and housing transfer sheets having images transferred thereto, and said document discharge means conveys the document, which has been fed to said exposure position of said copying machine and exposed there, to said sorter, and said automatic document feeder includes a document inversion mechanism for inverting the face and back of a document, and said document discharge means conveys the document, which has been fed to said exposure position of said copying machine and exposed there, to said sorter after inversion of the document through the document inversion mechanism.

* * * * *